United States Patent
Kim

(10) Patent No.: US 11,383,707 B2
(45) Date of Patent: Jul. 12, 2022

(54) VEHICLE SAFETY DEVICE DEPLOYMENT THRESHOLD ADJUSTMENT FOR SECONDARY COLLISIONS

(71) Applicants: Hyundai Motor Company, Seoul (KR); Kia Motors Corporation, Seoul (KR)

(72) Inventor: NamGyun Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 280 days.

(21) Appl. No.: 16/514,394

(22) Filed: Jul. 17, 2019

(65) Prior Publication Data

US 2020/0139963 A1    May 7, 2020

(30) Foreign Application Priority Data

Nov. 2, 2018 (KR) .................. 10-2018-0133441

(51) Int. Cl.
*B60W 30/095* (2012.01)
*B60W 30/09* (2012.01)
(Continued)

(52) U.S. Cl.
CPC ..... *B60W 30/0956* (2013.01); *B60R 21/0134* (2013.01); *B60W 10/18* (2013.01);
(Continued)

(58) Field of Classification Search
None
See application file for complete search history.

(56) References Cited

U.S. PATENT DOCUMENTS

2008/0319670 A1* 12/2008 Yopp .............. G08G 1/161
    701/301
2015/0019063 A1* 1/2015 Lu ................. B60K 28/14
    701/25
(Continued)

FOREIGN PATENT DOCUMENTS

KR   20120013799 A    2/2012
KR   20170131968 A    12/2017

OTHER PUBLICATIONS

K. Cho, S. B. Choi and H. Lee, "Design of an Airbag Deployment Algorithm Based on Precrash Information," in IEEE Transactions on Vehicular Technology, vol. 60, No. 4, pp. 1438-1452, May 2011, doi: 10.1109/TVT.2011.2126614. (Year: 2011).*

*Primary Examiner* — Christian Chace
*Assistant Examiner* — Katherine Marie Fitzharris
(74) *Attorney, Agent, or Firm* — Slater Matsil, LLP

(57) ABSTRACT

A vehicle includes an inertial sensor configured to measure a speed, a steering angle, and a yaw rate, a camera configured to acquire image data, a radar configured to acquire a radar data, and a safety device including an air bag and a seat belt pretensioner. A controller is configured to predict a collision with a first object located at the outside of the vehicle based on the image data or the radar data, predict a collision with a second object that is likely to occur after the collision with the first object based on an angle of reflection predicted at a time of the collision with the first object, and lower a deployment threshold that is compared with a collision severity such that the safety device is deployed before the collision with the second object.

32 Claims, 11 Drawing Sheets

(51) Int. Cl.
*B60W 10/30* (2006.01)
*B60R 21/0134* (2006.01)
*B60W 10/20* (2006.01)
*B60W 10/18* (2012.01)
*B60R 21/01* (2006.01)

(52) U.S. Cl.
CPC ............ *B60W 10/20* (2013.01); *B60W 10/30* (2013.01); *B60W 30/09* (2013.01); *B60R 2021/01272* (2013.01); *B60R 2021/01286* (2013.01); *B60W 2400/00* (2013.01); *B60W 2420/42* (2013.01); *B60W 2420/52* (2013.01); *B60W 2520/10* (2013.01); *B60W 2520/14* (2013.01); *B60W 2540/18* (2013.01); *B60W 2554/00* (2020.02); *B60W 2710/18* (2013.01); *B60W 2710/20* (2013.01); *B60W 2710/30* (2013.01)

(56) References Cited

U.S. PATENT DOCUMENTS

2016/0368445 A1* 12/2016 Foltin .................... G01S 17/931
2018/0141545 A1* 5/2018 Freytag .................... B60S 1/56

* cited by examiner

VEHICLE SAFETY DEVICE DEPLOYMENT THRESHOLD ADJUSTMENT FOR SECONDARY COLLISIONS

CROSS-REFERENCE TO RELATED APPLICATIONS

This application claims priority to Korean Patent Application No. 10-2018-0133441, filed in the Korean Intellectual Property Office on Nov. 2, 2018, which application is hereby incorporated herein by reference.

TECHNICAL FIELD

The present invention relates to a vehicle and a control method for the same.

BACKGROUND

With the advent of driver assistance systems (DASs), vehicles may predict a collision with an object located on a lane and may be controlled to avoid a collision.

In addition, in preparation for a collision that is predicted on the basis of the DAS, vehicles may be controlled so that a safety device is rapidly deployed. However, sensors included in the DAS may not operate due to a collision, and a secondary collision that may occur after the collision may not be prepared.

When a collision occurs with an impact insufficient to deploy a safety device, the user of the vehicle may be subject to an abnormal state, which may increase the possibility of a secondary collision.

SUMMARY

The present disclosure relates to a vehicle and a control method of the vehicle. In embodiments, the vehicle 1s capable of predicting a collision with an object and rapidly deploying a safety device in preparation for a collision.

Embodiments of the present disclosure provide a vehicle, in preparation for a secondary collision that occurs after a collision with an object, capable of determining the possibility of the secondary collision before the secondary collision and adjusting a deployment threshold of a safety device according to the possibility of the secondary collision for rapid deployment of the safety device, and a control method for the same.

Additional aspects of the invention will be set forth in part in the description which follows and, in part, will be obvious from the description, or may be learned by practice of the invention.

Therefore, it is an aspect of the present invention to provide a vehicle that includes an inertial sensor configured to measure a speed, a steering angle, and a yaw rate of the vehicle. A camera is configured to acquire an image data regarding a front of the vehicle. A radar is configured to acquire a radar data regarding an outside of the vehicle. A safety device includes an air bag and a seat belt pretensioner. A controller is configured to predict a collision with a first object located at the outside of the vehicle on the basis of at least one of the image data and the radar data, to predict a collision with a second object that is likely to occur after the collision with the first object on the basis of an angle of reflection predicted at a time of the collision with the first object, and in response to predicating predicting that the collision with the second object is likely to occur, to lower a deployment threshold that is compared with a collision severity such that the safety device is deployed before the collision with the second object.

The controller may recognize a plurality of objects located at the outside of the vehicle on the basis of the at least one of the image data and the radar data, determine a turning radius on the basis of at least one of the steering angle and the yaw rate to determine a first predicted travel route of the vehicle, determine the first object that has a possibility of collision with the vehicle on the first predicted travel route on the basis of a relative speed and a relative distance of each of the plurality of objects, determine a second predicted travel route of the vehicle on which the vehicle is predicted to travel after the collision on the basis of the angle of reflection, and in response to existence of the second object that has a possibility of collision with the vehicle on the second predicted travel route, lower the deployment threshold.

The controller may determine a region of interest with respect to the second predicted travel route, and determine the second object that is predicted to be located in the region of interest after the collision with the first object on the basis of the relative speed and the relative distance of each of the plurality of objects.

The controller may determine the possibility of collision with the second object on the basis of the second predicted travel route and a predicted position of the second object, and lower the deployment threshold in proportion to a probability of collision represented by the possibility of collision with the second object.

The probability of collision may have a normal distribution according to a distance to the predicted position of the second object in the second predicted travel route.

The controller may recognize a plurality of lines located at the outside of the vehicle on the basis of the at least one of the image data and the radar data, and determine the region of interest with respect to a lane on which the second predicted travel route is located, among a plurality of lanes segmented by the plurality of lines.

The controller may determine the region of interest to further include a lane adjacent to the lane on which the second predicted travel route is located.

The controller may determine the region of interest to further include a region in a direction opposite to a direction in which the collision with the first object is predicted to occur.

The vehicle may further include a braking system for controlling braking of the vehicle, wherein the controller may be configured to adjust the region of interest to be reduced in a longitudinal direction of the vehicle at a time of controlling the braking system after the collision with the first object.

The vehicle may further include a steering system for controlling steering of the vehicle, wherein the controller may be configured to adjust the region of interest to be increased in a lateral direction of the vehicle at a time of controlling the steering system after the collision with the first object.

The controller may determine a collision position and a collision angle in the collision with the first object on the basis of a relative speed and a relative position of the first object, and determine the reflection angle on the basis of a type of the first object, the collision position, and the collision angle.

The controller may determine the turning radius on the basis of a vehicle wheel angle determined by a wheelbase and the steering angle when the vehicle has a speed lower than or equal to a predetermined first threshold speed.

The controller may determine the turning radius on the basis of the speed and the yaw rate when the vehicle has a speed greater than or equal to a predetermined second threshold speed.

The controller may determine the turning radius on the basis of the speed, the steering angle, and the yaw rate when the vehicle has a speed greater than the predetermined first threshold but less than the predetermined second threshold speed.

The controller may determine the first predicted travel route to be a straight route when the turning radius is larger than a predetermined threshold radius.

The controller may recognize a plurality of lines located at the outside of the vehicle on the basis of the at least one of the image data and the radar data, and determine the first predicted travel route to be a lane that is segmented by lines that are closest to the vehicle, among the plurality of lines.

It is another aspect of the present invention to provide a method of controlling a vehicle including an inertial sensor configured to measure a speed, a steering angle, and a yaw rate of the vehicle, a camera configured to acquire an image data regarding a front of the vehicle, a radar configured to acquire a radar data regarding an outside of the vehicle, and a safety device including an air bag and a seat belt pretensioner, the method including: predicting a collision with a first object located at the outside of the vehicle on the basis of at least one of the image data and the radar data; predicting a collision with a second object that is likely to occur after the collision with the first object on the basis of an angle of reflection predicted at a time of the collision with the first object; and in response to predicting that the collision with the second object is likely to occur, lowering a deployment threshold that is compared with a collision severity such that the safety device is deployed before the collision with the second object.

The lowering of the deployment threshold may include: recognizing a plurality of objects located at the outside of the vehicle on the basis of the at least one of the image data and the radar data; determining a turning radius on the basis of at least one of the steering angle and the yaw rate to determine a first predicted travel route of the vehicle; determining the first object that has a possibility of collision with the vehicle on the first predicted travel route on the basis of a relative speed and a relative distance of each of the plurality of objects; determining a second predicted travel route of the vehicle on which the vehicle is predicted to travel after the collision on the basis of the angle of reflection; and in response to existence of the second object that has a possibility of collision with the vehicle on the second predicted travel route, lowering the deployment threshold.

The method may further include: determining a region of interest with respect to the second predicted travel route; and determining the second object that is predicted to be located in the region of interest after the collision with the first object on the basis of the relative speed and the relative distance of each of the plurality of objects.

The lowering of the deployment threshold may include: determining the possibility of collision with the second object on the basis of the second predicted travel route and a predicted position of the second object; and lowering the deployment threshold in proportion to a probability of collision represented by the possibility of collision with the second object.

The probability of collision may have a normal distribution according to a distance to the predicted position of the second object in the second predicted travel route.

The determining of the region of interest may include: recognizing a plurality of lines located at the outside of the vehicle on the basis of the at least one of the image data and the radar data; and determining the region of interest with respect to a lane on which the second predicted travel route is located, among a plurality of lanes segmented by the plurality of lines.

The determining of the region of interest may include: determining the region of interest to further include a lane adjacent to the lane on which the second predicted travel route is located.

The determining of the region of interest may include: determining the region of interest to further include a region in a direction opposite to a direction in which the collision with the first object is predicted to occur.

The vehicle may further include a braking system for controlling braking of the vehicle, wherein the method may further include adjusting the region of interest to be reduced in a longitudinal direction of the vehicle at a time of controlling the braking system after the collision with the first object.

The vehicle may further include a steering system for controlling steering of the vehicle, wherein the method may further include adjusting the region of interest to be increased in a lateral direction of the vehicle at a time of controlling the steering system after the collision with the first object.

The method may further include determining a collision position and a collision angle in the collision with the first object on the basis of a relative speed and a relative position of the first object; and determining the reflection angle on the basis of a type of the first object, the collision position, and the collision angle.

The determining of the turning radius may include determining the turning radius on the basis of a vehicle wheel angle determined by a wheelbase and the steering angle when the vehicle has a speed lower than or equal to a predetermined first threshold speed.

The determining of the turning radius may include determining the turning radius on the basis of the speed and the yaw rate when the vehicle has a speed greater than or equal to a predetermined second threshold speed.

The determining of the turning radius may include determining the turning radius on the basis of the speed, the steering angle, and the yaw rate when the vehicle has a speed greater than the predetermined first threshold but less than the predetermined second threshold speed.

The determining of the first predicted travel route may include determining the first predicted travel route to be a straight route when the turning radius is larger than a predetermined threshold radius.

The determining of the first predicted travel route may include: recognizing a plurality of lines located at the outside of the vehicle on the basis of the at least one of the image data and the radar data; and determining the first predicted travel route to be a lane that is segmented by lines that are closest to the vehicle, among the plurality of lines.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION OF ILLUSTRATIVE EMBODIMENTS

Figure 1:
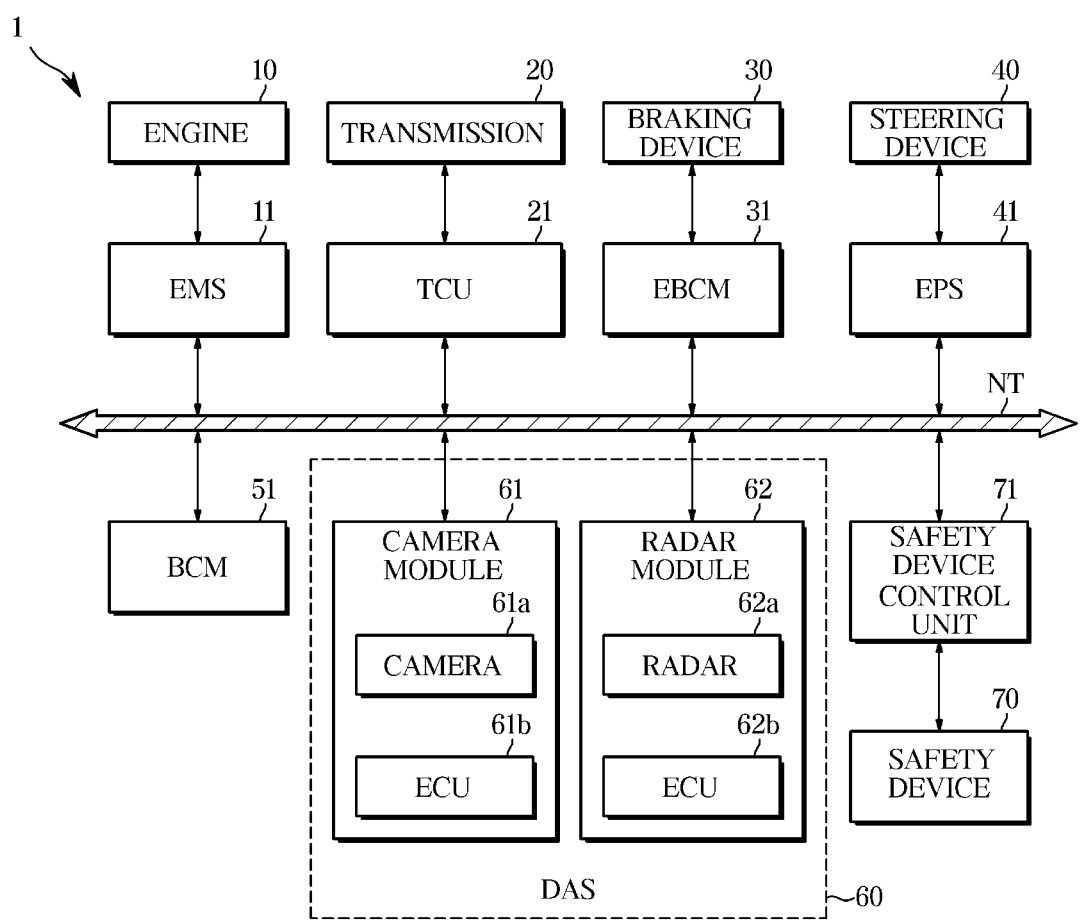
FIG. 1 is a diagram illustrating a configuration of a vehicle according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

As used herein, the singular forms "a," "an" and "the" are intended to include the plural forms as well, unless the context clearly indicates otherwise.

The terms, such as "~part", "~device", "~block", "~member", "~module", and the like may refer to a unit for processing at least one function or act. For example, the terms may refer to at least process processed by at least one hardware device, such as field-programmable gate array (FPGA)/application specific integrated circuit (ASIC), software stored in memories, or processors.

Reference numerals used for method operations are just used to distinguish each operation, but not to limit an order of the operations. Thus, unless the context clearly dictates otherwise, the written order may be practiced otherwise.

Hereinafter, a vehicle and a control method for the same will be described with reference to the accompanying drawings.

FIG. 1 is a diagram illustrating a configuration of a vehicle 1 according to an embodiment.

Referring to FIG. 1, the vehicle 1 includes an engine 10, a transmission 20, a braking device 30, a steering device 40, and a safety device 70. The engine 10 may include a cylinder and a piston, and may generate power for driving the vehicle 1. The transmission 20 may include a plurality of gears and may transmit the power generated by the engine 10 to vehicle wheels. The braking device 30 may decelerate the vehicle 1 or stop the vehicle 1 through friction with the vehicle wheels. The steering device 40 may change the traveling direction of the vehicle 1. The safety device 70 is a device for protecting a user of the vehicle 1 from an impact. The safety device 70 may include an airbag deployed at a time of collision and a seat belt pretensioner for tightening a seat belt in response to the seat belt being extended at the exit side during a collision.

The vehicle 1 may include a plurality of electronic components. For example, the vehicle 1 may include an engine management system (EMS) 11, a transmission control unit (TCU) 21, an electronic brake control module (EBCM) 31, an electronic power steering (EPS) 41, a body control module (BCM) 51, a driver assistance system (DAS) 60, and a safety device control unit 71.

The EMS 11 may control the engine 10 in response to acceleration intent of a driver through an accelerator pedal or a request of the DAS 60. For example, the EMS 11 may control the torque of the engine 10.

The TCU 21 may control the transmission 20 in response to a shift command of the driver through a shift lever and/or a travelling speed of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti-lock braking systems, ABS). The EBCM 31 may selectively release braking of the vehicle wheel in response to over-steering and/or under-steering sensed at a time of steering of the vehicle 1 (electronic stability control, ESC). In addition, the EBCM 31 may temporarily brake the vehicle wheels in response to a slip of the vehicle wheel sensed at a time of driving of the vehicle 1 (traction control system, TCS). In addition, the EBCM 31 may control the braking device 30 in response to a request from the DAS 60 (forward collision-avoidance assist, FCA).

The EPS 41 may assist the operation of the steering device 40 so that the driver easily manipulates the steering wheel, in response to a steering intent of the driver through the steering wheel. For example, the EPS 41 may assist the operation of the steering device 40 such that the steering force is reduced during low-speed traveling or parking and is increased during high-speed traveling. In addition, the EPS 41 may also control the steering device 40 in response to a request from the DAS 60 (emergency steering assist, ESA).

The BCM 51 may control the operation of the electronic components that provide convenience to the driver or ensure the safety of the driver. For example, the BCM 51 may control a head lamp, a wiper, a cluster, a multifunction switch, a turn signal, and the like.

The DAS 60 may assist the driver in manipulating (driving, braking, steering) the vehicle 1. For example, the DAS 60 may detect an environment (e.g., another vehicle, a pedestrian, a lane, a road sign, etc.) around the vehicle 1 and control the driving and/or braking and/or steering of the vehicle 1 in response to the sensed environment.

The DAS 60 may provide the driver with various functions. For example, the DAS 60 may provide a lane departure warning (LDW), a lane keeping assist (LKA), a high beam assist (HBA), a forward collision-avoidance assist (FCA), an emergency steering assist (ESA), a traffic sign recognition (TSR), a smart cruise control (SCC), a blind spot detection (BSD), and the like.

The DAS 60 may include a camera module 61 for acquiring image data around the vehicle 1 and a radar module 62 for acquiring object data around the vehicle 1.

The camera module 61 may include a camera 61a and an electronic control unit (ECU) 61b, and may photograph the front of the vehicle 1 and recognize other vehicles, pedestrians, lanes, road signs, and the like.

The radar module 62 may include a radar 62a and an electronic control unit (ECU) 62b and may acquire relative positions and relative speeds of objects (e.g., other vehicles, pedestrians, and the like) around the vehicle 1.

The safety device control unit 71 may control the safety device 70 to be deployed upon collision of the vehicle 1. In detail, the safety device control unit 71 calculates a collision severity on the basis of state information, such as the speed and the amount of impact of the vehicle 1 at a time of collision of the vehicle 1, compares the collision severity with a deployment threshold based on which the safety device 70 is deployed, and controls the safety device 70 to be deployed in response to a collision having a collision severity exceeding the deployment threshold. For example, when the collision severity exceeds the deployment threshold, the safety control unit 71 may allow the airbag to be inflated with a pressurized gas to deploy the airbag and allow the seat belt pretensioner to tighten the seat belt against extending from the exit side of the seat belt.

The above described electronic components may communicate with each other through vehicle communication network (NT). For example, the electrical components may exchange data therebetween through Ethernet, media oriented systems transport (MOST), Flexray, a controller area network (CAN), a local interconnect network (LIN), and the like. For example, the DAS 60 may transmit a driving control signal, a braking signal, and a steering signal to the EMS 111, the EBCM 31, and the EPS 41, respectively, through the NT.

Figure 2:
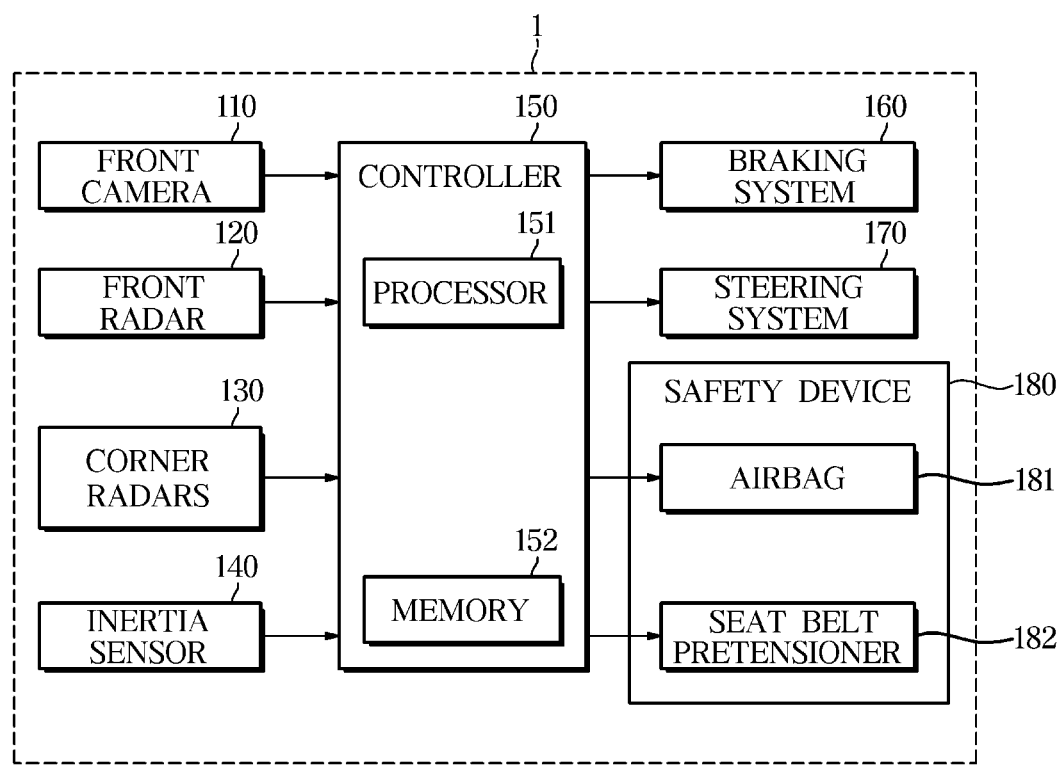
FIG. 2 is a control block diagram illustrating a vehicle according to an embodiment.
Figure 3:
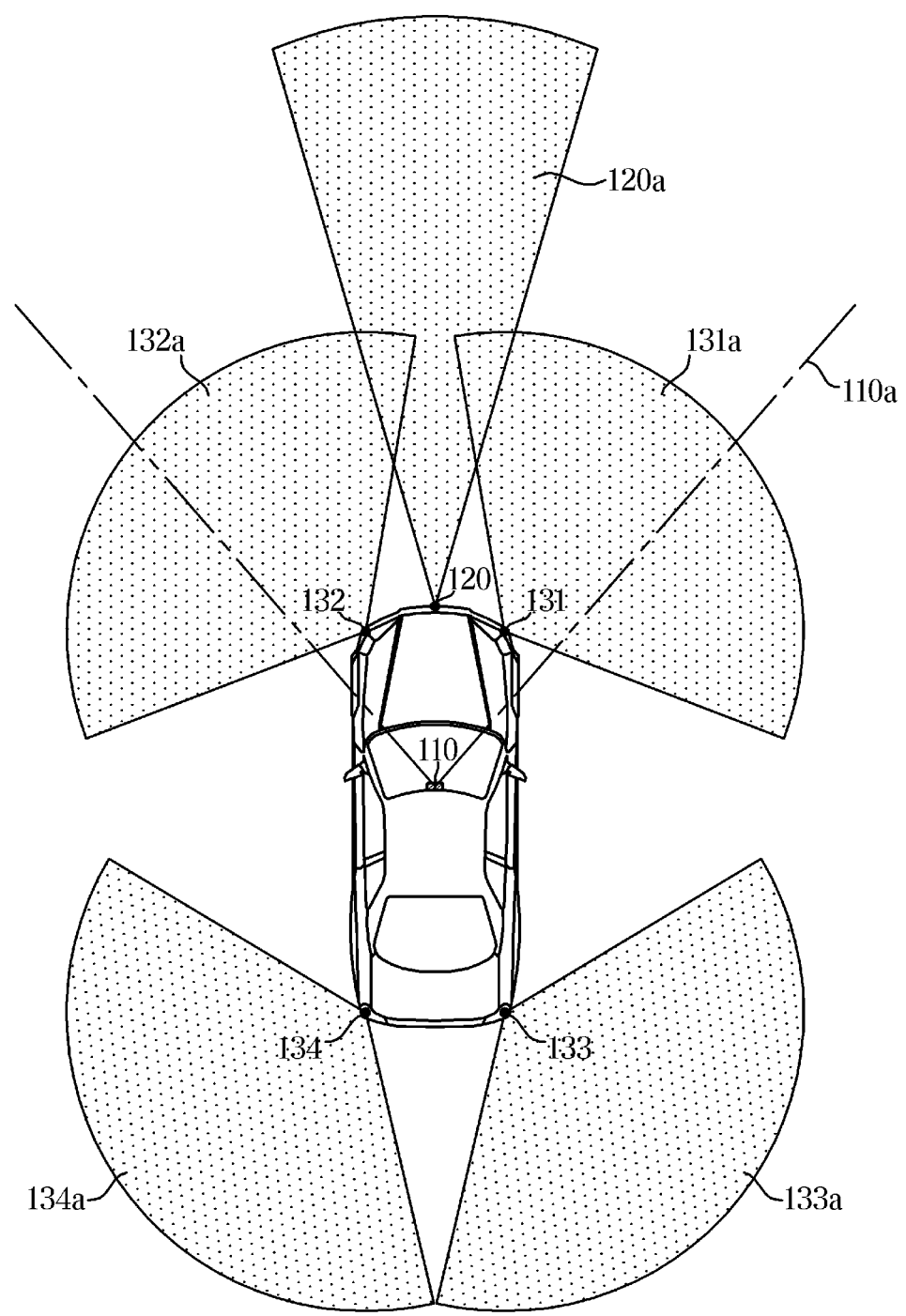
FIG. 3 is a diagram illustrating a camera and a radar included in a vehicle according to an embodiment.

FIG. 2 is a control block diagram illustrating a vehicle 1 according to an embodiment, and FIG. 3 is a diagram illustrating a camera 110 and radars 120 and 130 included in a vehicle 1 according to an embodiment.

Referring to FIG. 2, the vehicle 1 includes a front camera 110 for acquiring image data of the front of the vehicle 1, a front radar 120 for acquiring radar data of the front of the vehicle 1, a plurality of corner radars 130 for acquiring radar data of the side and rear of the vehicle 1, an inertial sensor 140 for measuring the speed, the steering angle, and the yaw rate of the vehicle 1, a controller 150 for determining a predicted travel route of the vehicle 1, determining a possibility of collision on the predicted travel route, and adjusting a deployment threshold based on which a safety device is deployed, a braking system 160 for controlling the braking of the vehicle 1, a steering system 170 for controlling the steering of the vehicle 1, and a safety device 180 for protecting the user of the vehicle 1 from a collision.

The front camera 110 according to the embodiment may have a field of view 110a directed to the front of the vehicle 1 as shown in FIG. 3. The front camera 110 may be installed, for example, on a front windshield of the vehicle 1.

The front camera 110 may photograph the front of the vehicle 1 and acquire image data regarding the front of the vehicle 1. The image data regarding the front of the vehicle 1 may include position information of an object, such as another vehicle and a pedestrian, or a lane located in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to the controller 150. For example, the front camera 110 may be connected to the controller 150 through a vehicle communication network NT, through a hard wire, or through a printed circuit board (PCB).

The front camera 110 may transmit the image data of the front of the vehicle 1 to the controller 150.

The front radar 120 according to the embodiment may have a field of sensing 120a directed to the front of the vehicle 1 as shown in FIG. 3. The front radar 120 may be installed, for example, in a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an object. The front radar 120 may acquire front radar data from the transmission radio waves transmitted by the transmission antenna and the reflection radio waves received by the reception antenna. Front radar data may include distance information and speed information regarding an object, such as another vehicle or a pedestrian existing in front of the vehicle 1. The front radar 120 may calculate the relative distance to the object on the basis of the phase difference (or time difference) between the transmission radio waves and the reflection radio waves, and calculate the relative speed of the object on the basis of the frequency difference between the transmission radio waves and the reflected radio waves.

The front radar 120 may be connected to the controller 150 through a vehicle communication network NT, a hard wire, or a printed circuit board. The front radar 120 may transmit the front radar data to the controller 150.

The plurality of corner radars 130 according to the embodiment includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed to the front right side of the vehicle 1 as shown in FIG. 3. The first corner radar 131 may be installed, for example, on the right side of a front bumper of the vehicle 1. The second corner radar 132 may have a field of sensing 132a directed to the front left side of the vehicle 1, and may be installed, for example, on the left side of the front bumper of the vehicle 1. The third corner radar 133 may have a field of sensing 133a directed to the rear right side of the vehicle 1 and may be installed, for example, on the right side of a rear bumper of the vehicle 1. The fourth corner radar 134 may have a field of sensing 134a directed to the rear left side of the vehicle 1 and may be installed, for example, on the left side of the rear bumper of the vehicle 1.

Each of the first, second, third and fourth corner radars 131, 132, 133, and 134 may include a transmission antenna and a reception antenna. The first, second, third, and fourth corner radars 131, 132, 133 and 134 acquire first corner radar data, second corner radar data, third corner radar data, and fourth corner radar data, respectively. The first corner radar data may include distance information and speed information regarding another vehicle or a pedestrian (hereinafter referred to as "an object") positioned on the front right side of the vehicle 1. The second corner radar data may include distance information and speed information regarding an object positioned on the front left side of the vehicle 1. The third and fourth corner radar data may respectively include distance and speed information regarding an object located on the rear right side of the vehicle 1 and distance and speed information regarding an object located on the rear left side of the vehicle 1, respectively.

Each of the first, second, third, and fourth corner radars 131, 132, 133 and 134 may be connected to the controller 150, for example, through a vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the controller 150.

The inertial sensor 140 according to the embodiment may be provided to detect the translational motion and the rotational motion of the vehicle 1.

In detail, the inertial sensor 140 may measure the speed and the acceleration to detect the translational motion of the vehicle 1, and may measure the steering angle and the yaw rate to detect the rotational motion of the vehicle 1.

To this end, the inertial sensor 140 may include an acceleration sensor (not shown) capable of measuring the speed and acceleration of the vehicle 1, a steering angle sensor (not shown) capable of measuring the steering angle of the vehicle 1, and a gyro sensor (not shown) capable of measuring the yaw rate of the vehicle 1.

The controller 150 according to the embodiment may determine a predicted travel route of the vehicle 1, determine the possibility of collision on the predicted travel route, and adjust a deployment threshold, which is a criterion for deploying the safety device 180, on the basis of the possibility of collision.

The controller 150 may include a control unit (see 101b in FIG. 1) of the camera module (101 in FIG. 1), and/or a control unit (see 102b in FIG. 1) of the radar module (102 in FIG. 1), and/or a separate unified control unit.

The controller 150 may include a processor 151 and a memory 152.

The processor 151 may process front image data of the front camera 110, front radar data of the first radar 120, and corner radar data of the plurality of corner radars 130, and generate a braking signal, a steering signal, and a safety device control signal for controlling the braking system 160, the steering system 170, and the safety device 180. For example, the processor 151 may include an image signal processor for processing front image data of the front camera 110, a digital signal processor for processing radar data of the radars 120 and 130, and/or a micro control unit (MCU) for generating a braking signal, a steering signal, and a safety device control signal.

The processor 151 may sense objects (e.g., another vehicle, a pedestrian, and the like) in front of the vehicle 1 on the basis of the front image data of the front camera 110, the front radar data of the front radar 120, and the corner radar data of the plurality of corner radars 130.

In detail, the processor 151 may acquire position information (distance and direction) and speed information (relative speed) of the objects in front of the vehicle 1 on the basis of the front radar data of the front radar 120 and the corner radar data of the plurality of corner radars 130.

That is, the processor 151 may acquire relative position information (distance and direction) and speed information (relative speed) of objects located in front of the vehicle 1 on the basis of the radar data of the radars 120 and 130.

The processor 151 may acquire position information (direction) and type information (for example, whether the object is another vehicle or a pedestrian) of the object in front of the vehicle 1 on the basis of the front image data of the front camera 110. In addition, the processor 151 allows an object sensed by the front image data to match an object sensed by the front radar data, and acquires the type information, the position information, and the speed information of front objects in front of the vehicle 1 on the basis of a result of the matching.

The processor 151 may generate a braking signal and a steering signal on the basis of the type information, the position information, and the speed information of the front objects.

For example, the processor 151 calculates a time to collision (TTC) between the vehicle 1 and the front object on the basis of the position information (distance) and the speed information (relative speed) of the front object, and warns the driver of a collision or transmits a braking signal to the braking system 160 on the basis of a result of comparing the TTC with a predetermined reference time. In response to the TTC less than a predetermined first reference time, the processor 151 may allow an alert to be output via audio and/or display. In response to the TTC less than a predetermined second reference time, the processor 151 may transmit a preliminary-braking signal to the braking system 160. In response to the TTC less than a predetermined third reference time, the processor 151 may transmit an emergency braking signal to the braking system 160. In this case, the second reference time is shorter than the first reference time, and the third reference time is shorter than the second reference time.

As another example, the processor 151 may calculate a distance to collision (DTC) on the basis of the speed information (relative speed) of the front objects, and warn the driver of a collision or transmit a braking signal to the braking system 160 on the basis of a result of comparing the DTC with distances to the front objects.

In addition, the processor 151 may warn the driver of a collision or transmit a steering signal to the steering system 170 on the basis of a result of comparing the TTC with a predetermined reference time. In response to the TTC less than a predetermined first reference time, the processor 151 may allow an alert to be output via audio and/or display. In response to the TTC less than a predetermined second reference time, the processor 151 may transmit a preliminary-steering signal to the steering system 170. In response to the TTC less than a predetermined third reference time, the processor 151 may transmit an emergency steering signal to the steering system 170. In this case, the second reference time is shorter than the first reference time, and the third reference time is shorter than the second reference time.

As another example, the processor 151 may calculate a distance to collision (DTC) on the basis of the speed information (relative speed) of the front objects, and warn the driver of a collision or transmit a steering signal to the steering system 170 on the basis of a result of comparing the DTC with distances to the front objects.

In addition, the processor 151 may acquire position information (distance and direction) and speed information (relative speed) of the objects on the lateral sides of the vehicle 1 (front right side, front left side, rear right side, and rear left side) on the basis of corner radar data of the plurality of corner radars 130.

As such, the processor 151 may recognize a plurality of objects located around the vehicle 1 on the basis of at least one of the image data acquired from the front camera 110 and the radar data acquired from the radars 120 and 130.

Although the object is described as corresponding to another vehicle, a pedestrian, and a structure located outside the vehicle 1, the present invention is not limited thereto. For example, the object may include any object that may be located on a travel route of the vehicle 1.

The processor 151 according to the embodiment may determine a turning radius on the basis of at least one of the steering angle and the yaw rate measured from the inertial sensor 140. The determination of the turning radius will be described below in detail.

The processor 151 according to the embodiment may determine a first predicted travel route on which the vehicle 1 is predicted to travel, on the basis of the determined turning radius.

The processor 151 according to the embodiment may determine the relative speed and the relative distance of each of the plurality of objects recognized on the basis of at least one of the image data and the radar data.

The processor 151 according to the embodiment may determine a first object having a possibility of collision with the vehicle 1 on the first predicted travel route on the basis of the relative speed and the relative distance of each of the plurality of objects.

In this case, the first object may correspond to an object which is predicted to collide with the vehicle 1 on the first predicted travel route on the basis of the relative speed and distance with respect to the vehicle 1.

The processor 151 according to the embodiment may determine a second predicted travel route on which the vehicle 1 is predicted to travel after the collision with the first object, on the basis of an angle of reflection according to the collision.

That is, the processor 151 may determine an angle by which the vehicle 1 is predicted to be reflected (i.e., bounced) after the collision with the first object in a situation in which the collision with the first object is predicted to occur, that is, an angle of reflection. The determination of the angle of reflection will be described below in detail.

The processor 151 according to the embodiment may determine existence of a second object having a possibility of collision with the vehicle 1 on the second predicted travel route.

In detail, the processor 151 may determine a region of interest with respect to the second predicted travel route, and determine the existence of the second object that is predicted to be located in the ROI after the collision with the first object.

The processor 151 may determine the possibility of collision with the second object on the basis of the predicted position of the second object predicted and the second predicted travel route predicted after the collision with the first object.

In this case, the possibility of collision with the second object may be represented by the probability of collision, and may be determined according to a probability distribution function forming a normal distribution according to the distance to a predicted position of the second object with respect to the second predicted traveling route.

The processor 151 according to the embodiment may lower a deployment threshold that is to be compared with a collision severity for deploying the safety device 180, in response to existence of the second object having a possibility of collision with the vehicle 1 on the second predicted travel route.

In detail, the processor 151 may lower the deployment threshold of the safety device 180 in proportion to the probability of collision represented by the possibility of collision with the second object.

In this way, the vehicle 1 may more rapidly deploy the safety device 180 in response to a secondary collision that is predicted to occur after a collision with the first object, that is, a collision with the second object.

That is, when a secondary collision is predicted to occur after a collision having a collision severity at which the safety device 180 is not deployed, the vehicle 1 may adjust the deployment threshold such that the safety device 180 is more rapidly deployed to protect the user of the vehicle 1 from the secondary collision, thereby more effectively protecting the user of the vehicle 1 from the secondary collision.

The processor 151 according to the embodiment may determine the relative distance and width of the object on the basis of at least one of the image data and the radar data, and may determine the amount of collision overlap between the vehicle 1 and the object on the basis of the relative distance and the width of the object.

In this case, the amount of collision overlap may represent a size of an area of the vehicle 1 in which a collision with the object is predicted.

In addition, the processor 151 according to the embodiment may determine a collision mode on the basis of the amount of collision overlap, and may determine a collision severity on the basis of the impact amount, the relative speed of the object at the time of collision, and the deceleration of the vehicle 1 at the time of collision.

In this case, the vehicle 1 may further include a front impact sensor (FIS) to measure the amount of impact according to a collision with an object. The FIS may be implemented in a mechanical-type FIS using a spring, or in an electronic-type FIS using a twisting system. However, the present invention is not limited thereto, and the FIS may be implemented using any sensor capable of measuring the amount of impact according to collision with an object.

The collision severity is a value that is compared to the deployment threshold, which is a criterion for deploying the safety device 180, and the processor 151 may control the safety device 180 to be deployed when the calculated collision severity is greater than or equal to the deployment threshold.

In detail, the processor 151 may control the safety device control unit (see 71 in FIG. 1) to deploy the safety device 180.

In this case, the collision severity may be proportional to the amount of impact, the relative speed of the object at the time of collision, and the magnitude of deceleration of the vehicle 1 at the time of collision.

In addition, the deployment threshold of the safety device 180 may vary depending on the collision mode. In detail, the collision mode may include a front collision mode, an angle collision mode, a pole collision mode, and a small overlap collision mode depending on the amount of collision overlap.

The processor 151 according to the embodiment may divide the front area of the vehicle 1 into n zones. The processor 151 may determine the collision mode to be a small overlap collision mode when a front left region or a front right region of the vehicle 1 corresponds to the amount of collision overlap, to be a pole collision mode when an intermediate region except for a front left region and a front right region corresponds to the amount of collision overlap, to be an angle collision mode when a part of an intermediate region and a front left region or front right region correspond to the amount of collision overlap, and to be a front collision mode when a front left region, a front right region, and an intermediate region correspond to the amount of collision overlap.

In this case, the deployment threshold of the safety device 180 may be set to the lowest value in response to the front collision mode, and may be set to the highest value in response to the small overlap collision mode.

That is, the deployment threshold of the safety device 180 may consecutively increase in the order of the front collision mode, the angle collision mode, the pole collision mode, and the small overlap collision mode.

The processor 151 according to the embodiment may determine whether to deploy the safety device 180 by comparing the collision severity with the deployment threshold of the safety device 180 that varies according to the collision mode.

The memory 152 stores programs and/or data for processing image data by the processor 151, programs and/or data for processing radar data by the processor 151, and programs and/or data for generating a braking signal, a steering signal and/or a safety device control signal by the processor 151.

The memory 152 may temporarily memorize the image data received from the front camera 110 and/or the radar data received from the radars 120 and 130, and may temporarily memorize a result of processing the image data and/or the radar data of the processor 151.

The memory 152 may include a volatile memory, such as an S-RAM, a D-RAM, and the like, and a non-volatile memory, such as a flash memory, a read only memory (ROM), an erasable programmable read only memory (EPROM), and the like.

The braking system 160 according to the embodiment includes the EBCM (31 in FIG. 1) and the braking device (30 in FIG. 1) described in conjunction with FIG. 1, and the steering system 170 may include the EPS (41 in FIG. 1) and the steering device (40 in FIG. 1).

The safety device 180 according to the embodiment may correspond to the safety device 70 shown in FIG. 1, and represent a device that protects the user of the vehicle 1 from an impact due to a collision.

In detail, the safety device 180 may include an airbag 181 deployed upon impact. The airbag 181 may be deployed by the pressurized gas introduced at the time of collision, and may be deployed on the front of the driver's seat, the front of the assistant seat, the lateral side of the driver's seat, and the lateral side of the assistant seat to mitigate the impact of the user of the vehicle 1. In addition, the airbag 181 may also be deployed in the form of a curtain at the top of the left window and the right window of the vehicle 1.

In addition, the safety device 180 may include a seat belt pretensioner 182 that is deployed upon impact. The seat belt pretensioner 182 may tighten a seat belt in response to the seat belt being extended from the exit side of the seat belt during the collision, thereby preventing the user of the vehicle 1 from jerking forward in a collision. In addition, the seat belt pretensioner 182 may release the seat belt backward to reduce the pressure applied to the upper body of the use of the vehicle 1 to minimize the injury of the user of the vehicle 1. To this end, the seat belt pretensioner 182 may include a motor (not shown) coupled to the seat belt.

Figure 4:
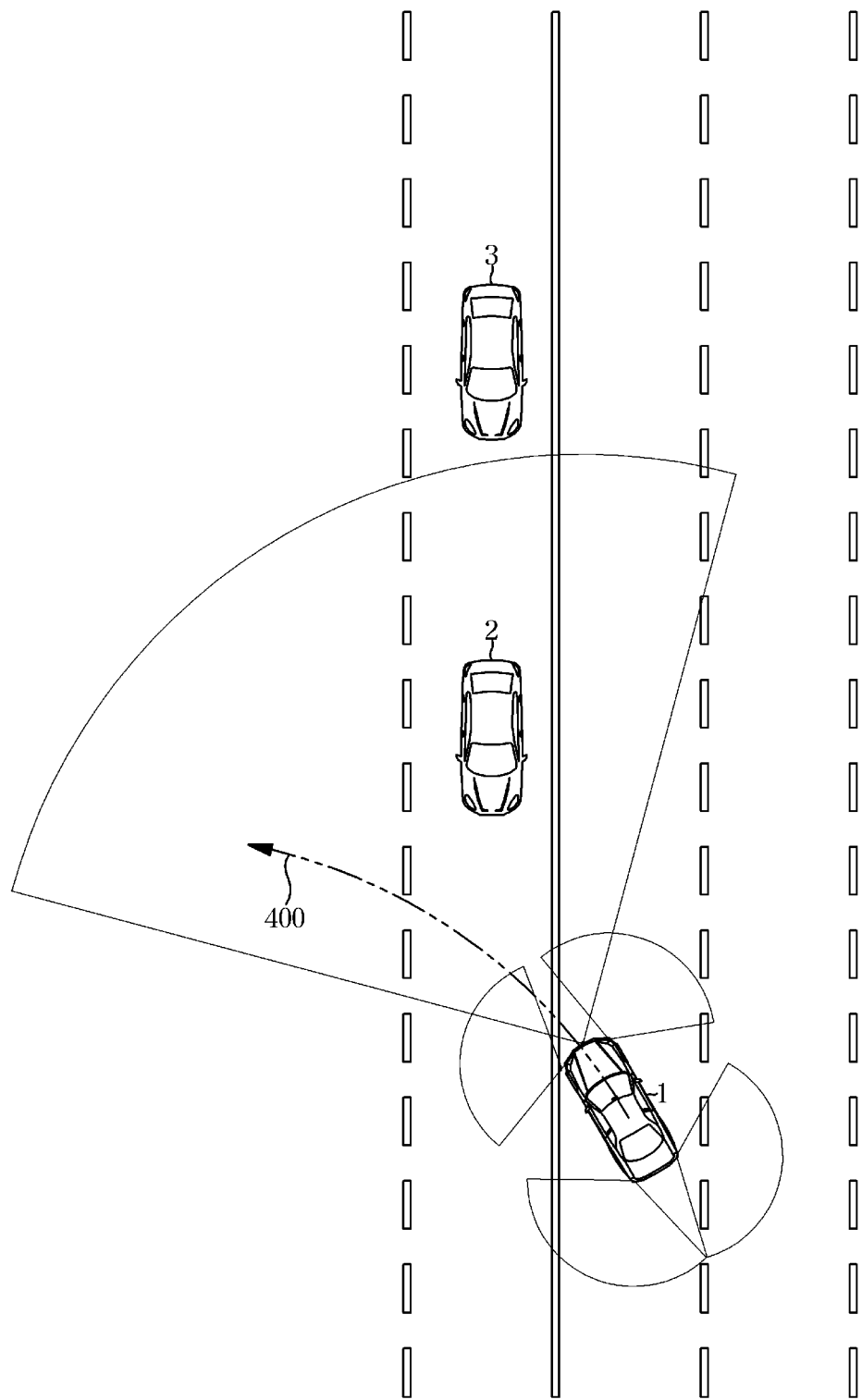
FIG. 4 is a diagram illustrating a vehicle according to an embodiment, which determines a first predicted travel route.

FIG. 4 is a diagram illustrating a vehicle 1 according to an embodiment which determines a first predicted travel route 400.

Referring to FIG. 4, the processor 151 according to the embodiment may recognize a plurality of objects 2 and 3 located around the vehicle 1 on the basis of at least one of the image data acquired from the front camera 110 and the radar data acquired from the radars 120 and 130.

Although the plurality of objects 2 and 3 are illustrated as other vehicles located outside the vehicle 1, the present invention is not limited thereto. For example, the objects may represent another vehicle, a pedestrian, and a structure located outside the vehicle 1. That is, the object may include various objects as long as it can be located on the travel route of the vehicle 1. Although the plurality of objects 2 and 3 are provided as two objects 2 and 3, the present invention is not limited thereto, and the number of objects recognizable by the processor 151 is not limited.

In addition, the processor 151 according to the embodiment may determine the turning radius on the basis of at least one of the steering angle and the yaw rate measured from the inertial sensor 140, and determine the first predicted travel route 400 on which the vehicle 1 is predicted to travel, on the basis of the determined turning radius.

In detail, the processor 151 may determine the turning radius r on the basis of a wheelbase l of the vehicle 1 and a vehicle wheel angle Θ determined by the steering angle. In this case, the wheelbase l and the vehicle wheel angle Θ of the vehicle 1 are calculated as Equation 1 below.

$$r = \frac{l}{\theta} \qquad \text{[Equation 1]}$$

In this case, the vehicle wheel angle Θ may represent an angle at which the vehicle wheel is turned with respect to the longitudinal direction corresponding to the forward direction of the vehicle 1, and may be determined according to the ratio of a steering angle to a steering gear ratio. In addition, the steering gear ratio may correspond to a gear ratio set for gears that transmit the turning force of the steering wheel to the vehicle wheels.

In addition, the processor 151 may determine the turning radius r on the basis of the speed v and the yaw rate ω of the vehicle 1. In this case, the speed v and the yaw rate ω of the vehicle 1 are calculated as Equation 2 below.

$$r = \frac{v}{\omega} \qquad \text{[Equation 2]}$$

In addition, the processor 151 may determine the turning radius r on the basis of both the steering angle and the yaw rate. In detail, the processor 151 may determine an adjusted yaw rate $\omega_{mix}$ of a current point of time on the basis of a yaw rate of the current point of time and a change in vehicle wheel angle ΔΘ measured from a previous point of time ahead of a predetermined time period to the current point of time.

In this case, the speed v of the vehicle 1 and the adjusted yaw rate $\omega_{mix}$ are calculated as Equation 3 below $$r = \frac{v}{\omega_{mix}} = \frac{v}{\alpha \cdot \omega + (1-\alpha) \cdot (\omega_{mix,prev} + \Delta\theta)} \quad \text{[Equation 3]}$$

In Equation 3, $\omega_{mix,\,prev}$ denotes an adjusted yaw rate of the previous point of time ahead of the predetermined time interval, and α denotes a constant for adjusting a proportion of each of the yaw rate ω of the current point of time and the change in vehicle wheel angle ΔΘ from the previous point of time ahead of the predetermined time interval to the current point of time that is reflected in the adjusted yaw rate $\omega_{mix}$, as a preset value.

In this way, the processor 151 may determine the turning radius of the vehicle 1 on the basis of at least one of the steering angle and the yaw rate measured from the inertial sensor 140.

In this case, the processor 151 may determine the turning radius on the basis of the vehicle wheel angle determined by the wheelbase and the steering angle, when the speed of the vehicle 1 is less than or equal to a predetermined first threshold speed.

In addition, the processor 151 may determine the turning radius on the basis of the speed and the yaw rate of the vehicle 1 when the speed of the vehicle 1 is equal to or higher than a predetermined second threshold speed.

In addition, the processor 151 may determine the turning radius on the basis of the speed, the steering angle, and the yaw rate of the vehicle 1 when the speed of the vehicle 1 is greater than the predetermined first threshold speed but less than the predetermined second threshold speed.

That is, the processor 151 determines the turning radius on the basis of the wheelbase and the steering angle when the speed of the vehicle 1 is a low speed less than or equal to the predetermined first threshold speed, and determines the turning radius on the basis of the speed, the steering angle, and yaw rate of the vehicle 1 when the speed of the vehicle 1 is a medium speed greater than the predetermined first threshold speed but less than the predetermined second threshold speed, and determines the turning radius on the basis of the speed and the yaw rate of the vehicle 1 when the speed of the vehicle 1 is a high speed greater than or equal to the predetermined second threshold speed.

This is because as the speed of the vehicle 1 increases, the precision of a turning radius determined using the yaw rate becomes higher. The first threshold speed and the second threshold speed may be set in advance in the design stage of the vehicle 1, or may be adjusted later.

The processor 151 may determine a route corresponding to the determined turning radius to be the first predicted traveling route 400. As such, the processor 151 may determine the first predicted travel route 400 by determining the turning radius on the basis of at least one of the steering angle and the yaw rate measured from the inertial sensor 140.

In addition, the processor 151 according to the embodiment may determine a straight forward route to be the first predicted traveling route 400 when the determined turning radius is larger than a predetermined threshold radius. This is because the vehicle 1 may have a great steering angle while on the straight forward route, depending on a driving pattern of the user during traveling. Accordingly, upon determining the turning radius to be larger than the predetermined threshold radius, the processor 151 may determine that the vehicle 1 is running straight and therefore may determine the straight forward route to be the first predicted traveling route 400.

In this case, the processor 151 may recognize a plurality of lines located outside the vehicle 1 on the basis of at least one of the image data and the radar data, and determine a lane defined by lines that are closet to the vehicle 1 among the plurality of lines to be the first predicted traveling route 400.

Figure 5:
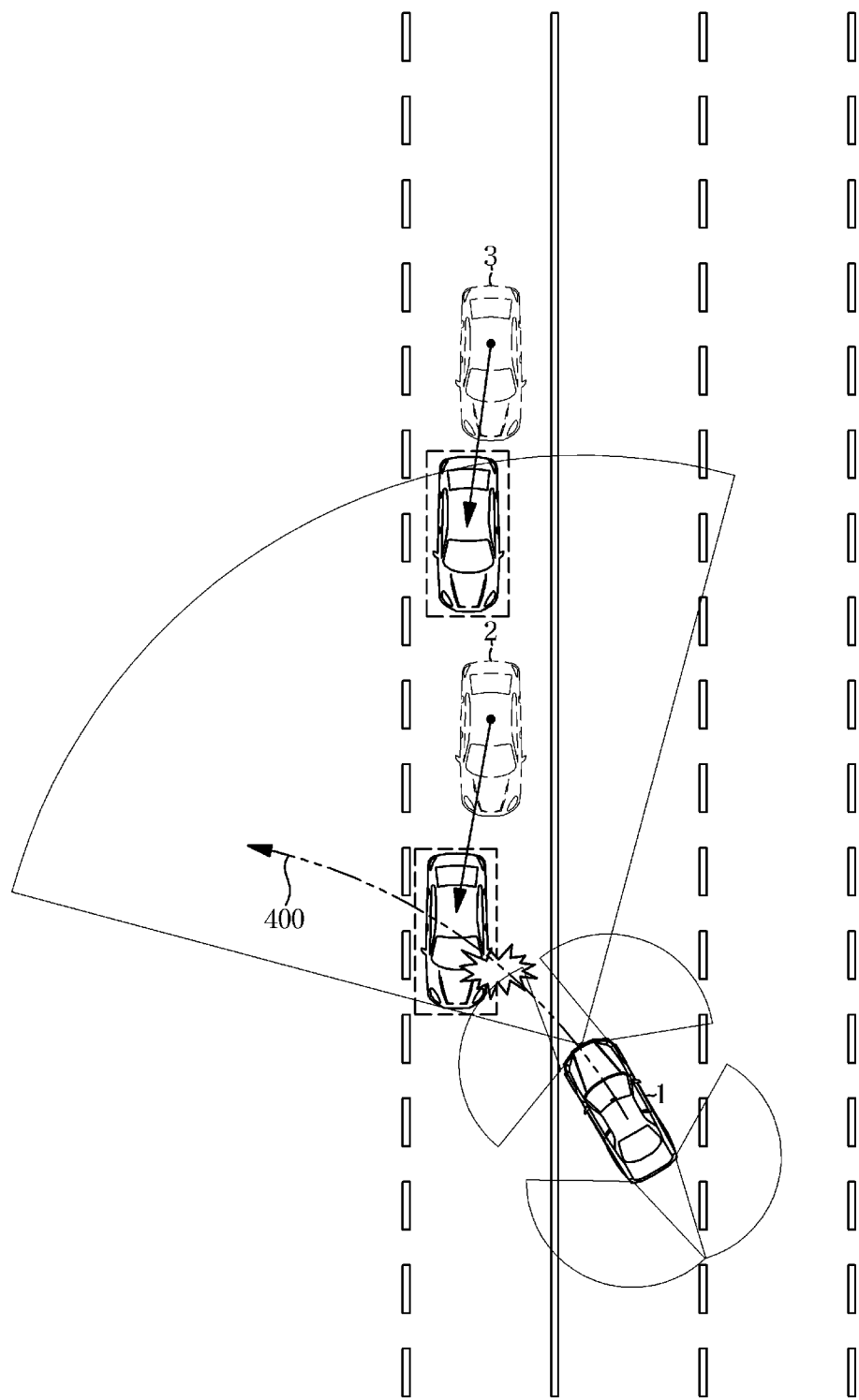
FIG. 5 is a diagram illustrating a vehicle according to an embodiment, which predicts a collision on a first predicted travel route.

FIG. 5 is a diagram illustrating a vehicle 1 according to an embodiment, which predicts a collision on a first predicted travel route 400.

Referring to FIG. 5, the processor 151 according to the embodiment may determine the relative speed and relative distance of each of the recognized plurality of objects 2 and 3 on the basis of at least one of the image data and the radar data.

The processor 151 according to the embodiment may determine a first object 2 that is likely to collide with the vehicle 1 on the first predicted traveling route 400 on the basis of the relative speed and relative distance of each of the plurality of objects 2 and 3.

In this case, the first object 2 is an object that is predicted to collide with the vehicle 1 on the first predicted travel route 400 on the basis of the relative speed and relative distance with respect to the vehicle 1, among the plurality of objects 2 and 3.

In detail, the processor 151 may determine a predicted travel route for each of the plurality of objects 2 and 3 on the basis of the relative speed and the relative distance of each of the plurality of objects 2 and 3, compare the respective predicted travel routes with the first predicted travel route 400 to determine the possibility of collision of each object 2 or 3 with the vehicle 1 on the first predicted travel route 400, and determine a first object 2 that is likely to collide with the vehicle 1 on the first predicted travel route 400.

In this case, the processor 151 may calculate the time to collision on the basis of the relative speed and the relative distance of the first object 2, and determine the possibility of collision with the first object 2 by continuously determining the relative speed and the relative distance of the first object 2 during the determined time to collision.

Figure 6:
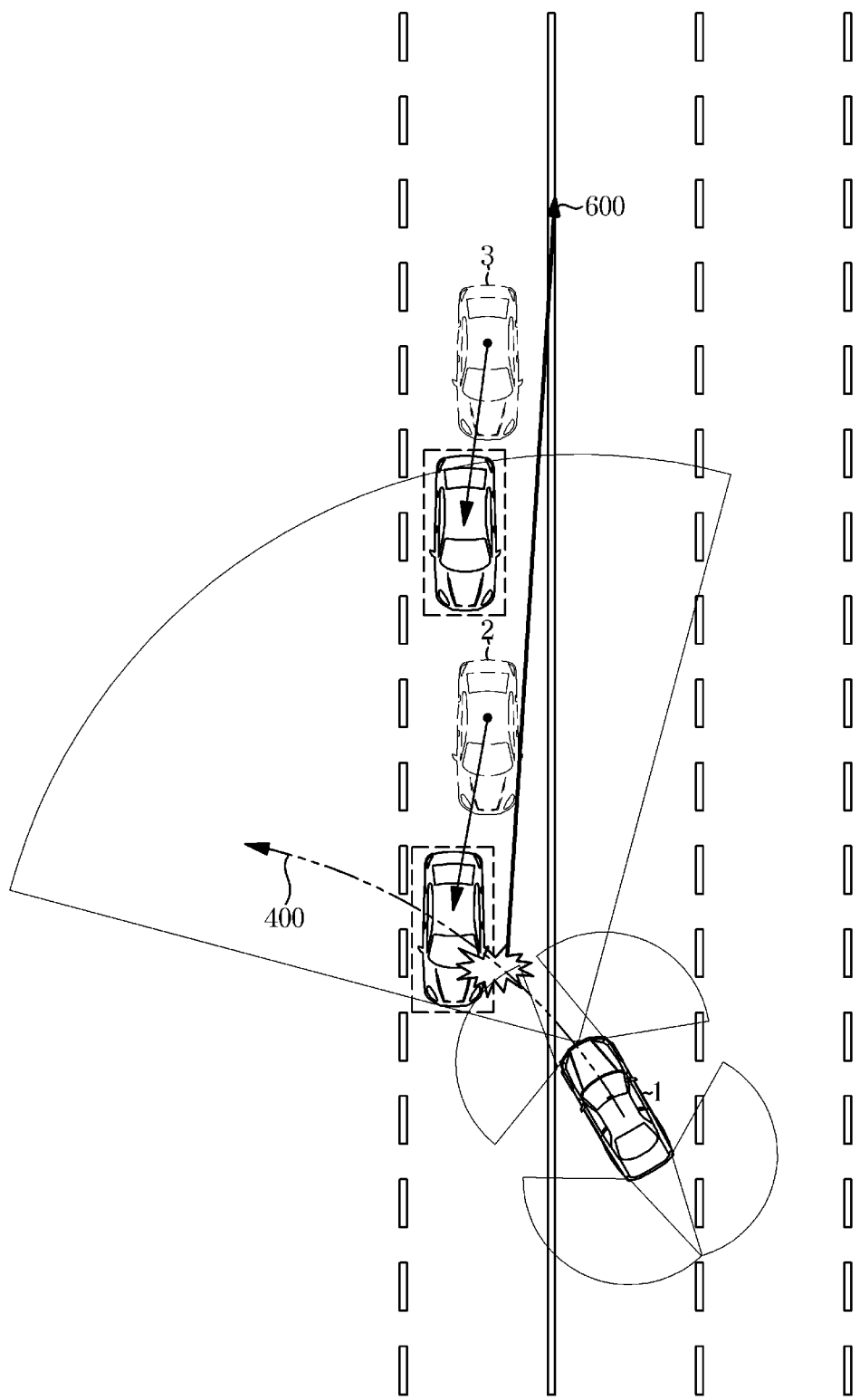
FIG. 6 is a diagram illustrating a vehicle according to an embodiment, which determines a second predicted travel route.

FIG. 6 is a diagram illustrating a vehicle 1 according to an embodiment, which determines a second predicted travel route 600.

Referring to FIG. 6, the processor 151 according to the embodiment may determine the second predicted travel route 600 on which the vehicle 1 is predicted to travel after the collision with the first object 2 on the basis of a predicted angle of reflection in the collision with the first object 2.

That is, the processor 151 may determine an angle at which the vehicle 1 is predicted to be reflected after collision with the first object 2 in a situation in which a collision with the first object 2 is predicted to occur.

In detail, the processor 151 determines, in response to existence of a possibility of collision with the first object 2, a collision position and a collision angle in a collision with the first object 2 on the basis of the relative speed and the relative distance of the first object 2.

In this case, the collision position corresponds to a position in which the collision occurs in the outer appearance of the vehicle 1, and the collision angle corresponds to an angle formed between a longitudinal direction of the first object 2 and a heading direction of the vehicle 1 at the time of collision.

The processor 151 may determine the angle of reflection on the basis of the type of the first object 2, the collision position in the collision with the first object 2, and the collision angle in the collision with the first object 2.

In this case, the processor 151 may determine the type of the object on the basis of the image data acquired from the front camera 110.

In this case, the memory 152 may store information regarding an angle of reflection according to a type of an object, a collision position, and a collision angle. That is, the memory 152 may store information regarding a predetermined angle of reflection according to an object type-specific elastic modulus, a collision position, and a collision angle.

For example, even at the same collision position and the same collision angle, an object corresponding to a normal passenger vehicle has an angle of reflection greater than that of an object corresponding to a truck or bus.

That is, the processor 151 may compare the type of the first object 2, the collision position in the collision with the first object 2, and the collision angle in the collision with the first object 2 with the information regarding the angle of reflection stored in the memory 152 to determine a predicted angle of reflection due to the collision with the first object 2.

In addition, the processor 151 may determine a direction in which the vehicle 1 is predicted to travel after the collision with the first object 2 on the basis of the predicted angle of reflection due to the collision with the first object 2, and may determine the second predicted traveling route 600 on the basis of the determined direction.

Accordingly, the processor 151 may determine the second predicted traveling route 600 on which the vehicle 1 is predicted to travel after the collision with the first object 2 on the basis of the predicted angle of reflection due to the collision with the first object 2.

Figure 7:
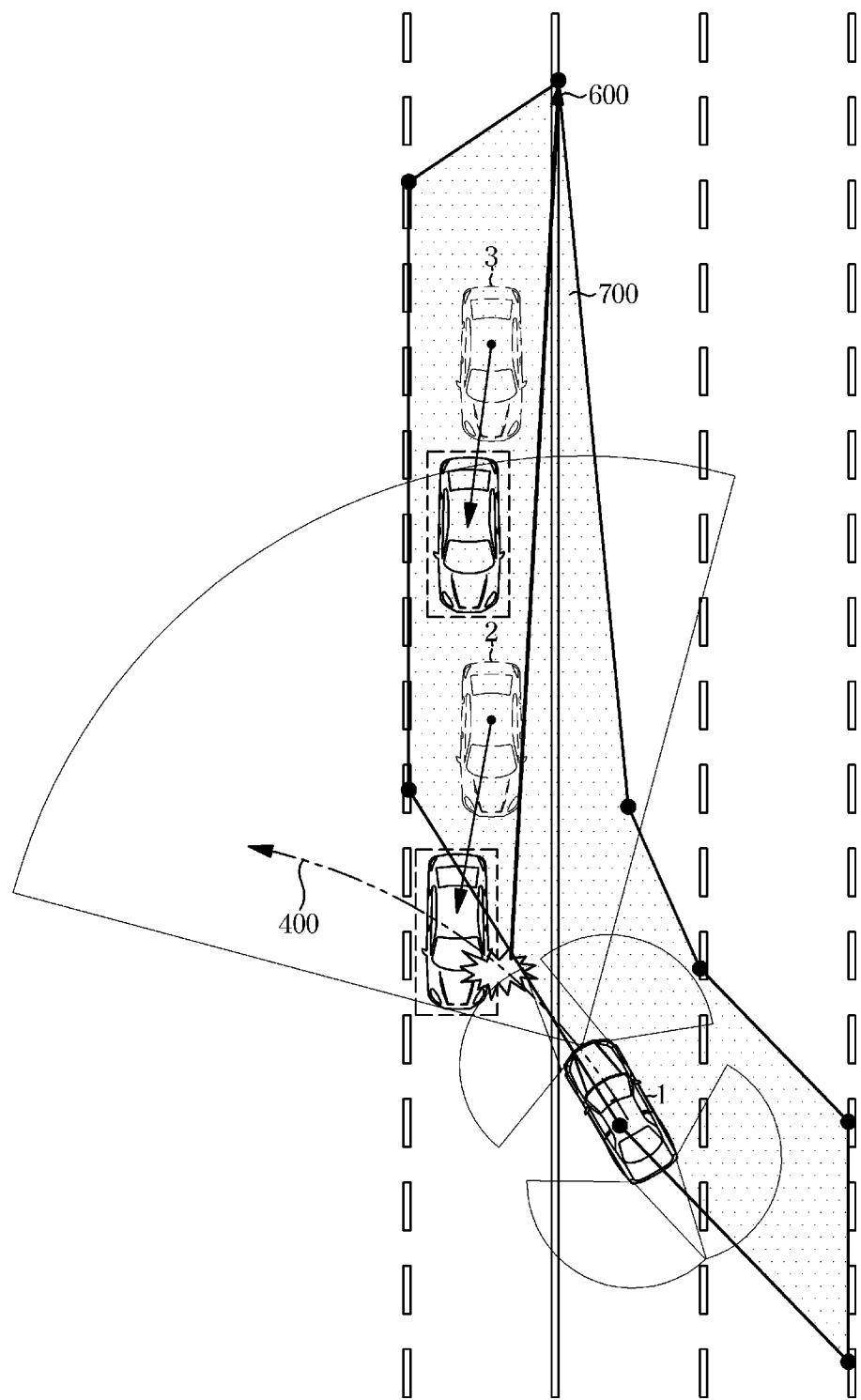
FIG. 7 is a diagram illustrating a region of interest for predicting a collision on a second predicted travel route of a vehicle according to an embodiment.
Figure 8:
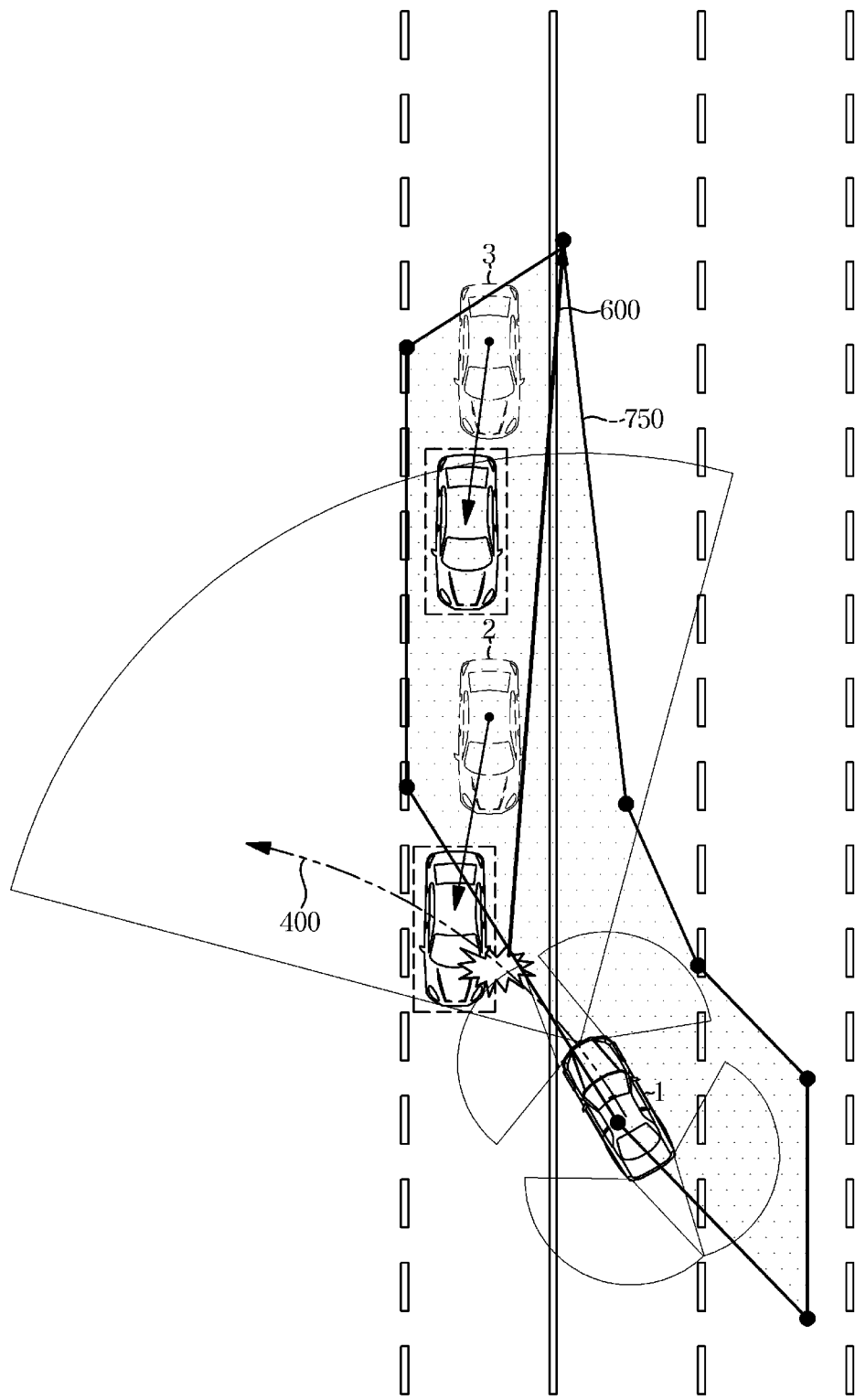
FIGS. 8 and 9 are diagrams illustrating a vehicle according to an embodiment, in which a region of interest is adjusted.
Figure 9:
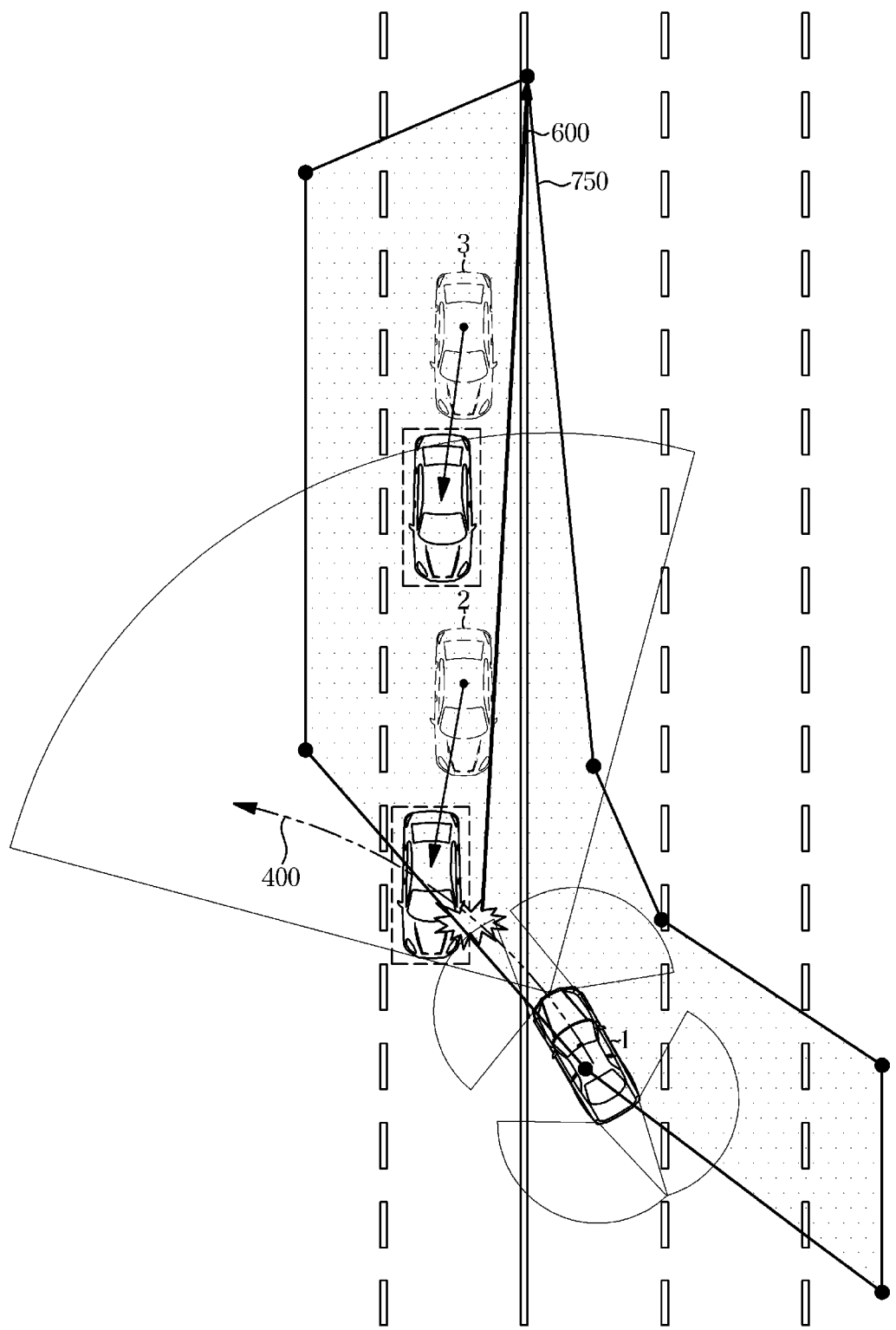

FIG. 7 is a diagram illustrating a region of interest (ROI) 700 for predicting a collision on a second predicted travel route 600 of a vehicle 1 according to an embodiment, and FIGS. 8 and 9 are diagrams illustrating a vehicle 1 according to an embodiment in which a region of interest 700 is adjusted.

Referring to FIG. 7, the processor 151 according to the embodiment may determine existence of a second object 2 that is likely to collide with the vehicle 1 on the second predicted traveling route 600.

In detail, the processor 151 may determine the ROI 700 with respect to the second predicted travel route 600, and may determine existence of a second object 3 that is predicted to be located in the ROI 700 after the collision with the first object 2 on the basis of the relative speed and relative distance of each of the plurality of objects 2 and 3.

The processor 151 may determine the possibility of collision with the second object 3 on the basis of the position of the second object 3 and the second predicted travel route 600 predicted after the collision with the first object 2.

In this case, the possibility of collision with the second object 3 may be represented by the probability of collision, and may be determined by a probability distribution function that forms a normal distribution according to the distance to the predicted position of the second object 3 with respect to the second predicted traveling route 600.

That is, the processor 151 may determine the possibility of collision represented by the probability of collision r according to a probability distribution function that forms a normal distribution with the distance to the predicted position of the second object 3 with respect to the second predicted traveling route 600.

To this end, the processor 151 may first set the ROI 700 with respect to the second predicted travel route 600.

In detail, the processor 151 recognizes a plurality of lines located outside the vehicle 1 on the basis of at least one of the image data and the radar data, and determines the ROI 700 with respect to a lane on which the second predicted travel route 600 is located among a plurality of lanes defined by the plurality of lines.

In addition, the processor 151 may determine the ROI 700 to further include a lane adjacent to the lane in which the second predicted travel route 600 is located. This is because the vehicle 1 may travel on a route adjacent to the second predicted travel route 600 after the collision with the first object 2 rather than travelling on the second predicted traveling route 600 according to the braking and steering control of the user of the vehicle 1.

In addition, the processor 151 may determine the ROI to further include a region in a direction opposite to a direction in which the collision with the first object 2 is predicted to occur. This is to consider a case in which the vehicle 1 may be reflected at an angle different from an angle determined by the processor 151 after the collision with the first object 2. In detail, when the vehicle 1 collides with the first object 2, the user of the vehicle 1 may perform sudden braking or rapid steering. In this case, the vehicle 1 may collide with a rear lateral side object (not shown) located in a direction opposite to a direction of collision with the first object 2. Accordingly, the processor 151 may allow the ROI 700 to further include a region in a direction opposite to a direction in which the collision with the first object 2 is predicted to occur so that a rear lateral side object (not shown) may be determined to be a second object 3 as being predicted to collide after the collision with the first object 2.

As such, the processor 151 determines the ROI 700 for determining the second object 3 that is likely to collide with the vehicle 1 after the collision with the first object 2 with respect to the second predicted travel route 600.

That is, the processor 151 may determine a second object 3 that is predicted to be located in the ROI 700 after the collision with the first object 2 on the basis of at least one of the image data and the radar data.

In detail, the processor 151 according to the embodiment may determine a second object 3 that is predicted to be located in the ROI 700 after the collision with the first object 2 using the relative speed and the relative distance of a plurality of objects recognized on the basis of at least one of the image data and the radar data.

In addition, the processor 151 according to the embodiment may adaptively adjust the size of the ROI 700.

Referring to FIG. 8, the processor 151 according to the embodiment may adjust the ROI 700 to be reduced in the longitudinal direction of the vehicle 1 in response to the braking system 160 being controlled to brake the vehicle 1 after the collision with the first object 2.

That is, when the braking system 160 is operated to brake the vehicle 1 under the control of the processor 151 after the collision with the first object 2, the processor 151 may reduce the ROI 700 in the travelling direction of the vehicle 1, that is, the longitudinal direction of the vehicle 1.

Referring to FIG. 8, it can be seen that an adjusted ROI 750 has an area in the longitudinal direction of the vehicle 1 which is narrower than that of the ROI 700.

In detail, the processor 151 according to the embodiment may calculate the time to collision of the vehicle 1 with a front object after collision with the first object 2 on the basis of the relative position and relative distance of each of a plurality of objects recognized by at least one of the image data and the radar data, and may transmit a braking signal to the braking system 160 on the basis of a result of comparing the time to collision with a predetermined reference time.

In this case, since the vehicle 1 brakes to reduce the amount of movement in the longitudinal direction, the processor 151 may reduce the ROI 700 in the longitudinal direction of the vehicle 1. Accordingly, the amount of computation for the image data and the radar data of the processor 151 may be reduced, and the second object 3 may be more rapidly determined from the less amount of computation, so that a deployment threshold of the safety device 180 is more rapidly and accurately adjusted in preparation for a collision with the second object 3.

In addition, referring to FIG. 9, the processor 151 according to the embodiment may adjust the ROI 700 to be increased in the lateral direction of the vehicle 1 in response to the steering system 170 being controlled to steer the vehicle 1 after the collision with the first object 2.

That is, when the steering system 170 is operated to steer the vehicle 1 under the control of the processor 151 after the collision with the first object 2, the processor 151 may increase the ROI 700 in a direction perpendicular to the traveling direction of the vehicle 1, that is, the lateral direction of the vehicle 1.

Referring to FIG. 9, it can be seen that an adjusted ROI 750 has an area in the lateral direction of the vehicle 1 which is larger than the ROI 700.

In detail, the processor 151 according to the embodiment may calculate the time to collision of the vehicle 1 with a front object after collision with the first object 2 on the basis of the relative position and relative distance of each of a plurality of objects recognized by at least one of the image data and the radar data, and may transmit a steering signal to the steering system 170 on the basis of a result of comparing the time to collision with a predetermined reference time.

In this case, since the vehicle 1 is steered to increase the amount of movement in the lateral direction, the processor 151 may increase the ROI 700 in the lateral direction of the vehicle 1. As such, the processor 151 determines the second object 3 on the basis of the adjusted ROI 750, on which the increased lateral movement is reflected, and thus the second object 3 that is likely to collide with the vehicle 1 is more accurately determined, so that a deployment threshold of the safety device 180 is accurately adjusted in preparation for a collision with the second object 3.

Figure 10:
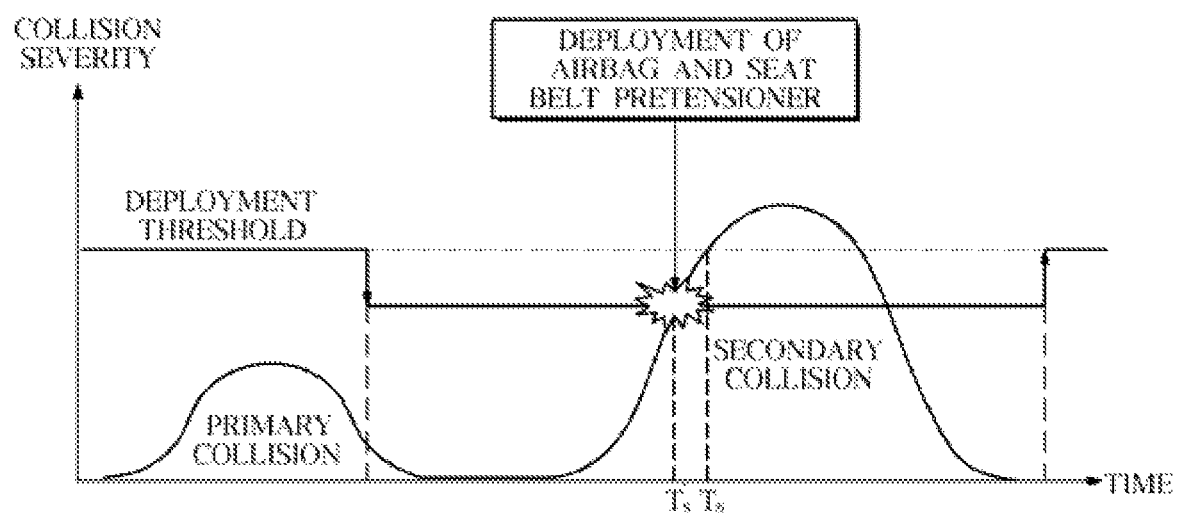
FIG. 10 is a diagram illustrating a vehicle according to an embodiment, in which a deployment threshold of a safety device is adjusted on the basis of a collision prediction on a second predicted travel route.

FIG. 10 is a diagram illustrating a vehicle 1 according to an embodiment in which a deployment threshold of a safety device 180 is adjusted on the basis of a collision prediction on a second predicted travel route 600.

Referring to FIG. 10, the processor 151 according to the embodiment may determine existence of a second object 3 that is likely to collide with the vehicle 1 on the second predicted traveling route 600.

In detail, the processor 151 may determine the ROI 700 with respect to the second predicted traveling route 600, and may determine the existence of the second object 3 that is predicted to be located in the ROI 700 after the collision with the first object 2 using the relative position and relative speed of each of the plurality of objects recognized on the basis of at least one of the image data and the radar data.

The processor 151 according to the embodiment, in response to existence of the second object 3 that is predicted to be located in the ROI 700 after the collision with the first object 2, may determine the possibility of collision with the second object 3 on the basis of the position of the second object 3 and the second predicted travel route 600 predicted after the collision with the first object 2.

In this case, the possibility of collision with the second object 3 may be represented by the probability of collision, and may be determined by a probability distribution function that forms a normal distribution according to the distance to the predicted position of the second object 3 with respect to the second predicted traveling route 600.

That is, as the predicted position of the second object 3 after the collision with the first object 2 becomes distant from the second predicted travel route 600, the possibility of collision is determined to have a low probability of collision. For example, when the predicted position of the second object 3 is on the second predicted traveling route 600, the possibility of collision may have a probability of collision of 100%, and as the predicted position of the second object 3 becomes distant from the second predicted traveling route 600, the probability of collision indicating the possibility of collision may decrease.

The processor 151 according to the embodiment may lower a deployment threshold that is to be compared with a collision severity for deploying the safety device 180 in response to existence of the second object 3 that is likely to collide with the vehicle 1 on the second predicted travel route 600.

In this case, the degree to which the deployment threshold of the safety device 180 is lowered may be proportional to the probability of collision indicating the possibility of collision between the vehicle 1 and the second object 3. That is, in the case of a high probability of collision, the processor 151 may lower the deployment threshold of the safety device 180 to a large degree such that the safety device 180 is more rapidly deployed.

In this way, the vehicle 1 may more rapidly deploy the safety device 180 in a secondary collision predicted after a collision with a first object, that is, a collision with a second object.

Referring to FIG. 10, the processor 151, in response to the existence of the second object 3 that is likely to collide with the vehicle 1 on the second predicted traveling route 600, may lower the deployment threshold.

Accordingly, the safety device 180 may be deployed earlier than a point of time for deploying the safety device 180 when the deployment threshold is not adjusted. In detail, under the same situation of a collision, TS denotes a deployment time of the safety device 180 before the deployment threshold is adjusted to be lowered, and TS' denotes a deployment time of the safety device 180 after the deployment threshold is adjusted to be lowered.

As such, in response to the existence of the second object 3 that is likely to collide with the vehicle 1 on the second predicted traveling route 600, the processor 151 adjusts the deployment threshold of the airbag 181 and the seat belt pretensioner 182 corresponding to the safety device 180 to be lowered, so that the safety device 180 is deployed at a lower collision severity, that is, at an earlier point of time, thus allowing the safety of the user of the vehicle 1 to be more efficiently achieved.

That is, when the vehicle 1 is predicted to have a secondary collision after a collision of an impact severity at which the safety device 180 is not deployed, the vehicle 1 adjusts the deployment threshold such that the safety device 180 is more rapidly deployed to protect the user of the vehicle 1 from the secondary collision, thus more effectively protecting the user of the safety device 180 from the secondary collision.

Hereinafter, the development of the safety device 180 will be described in more detail.

The processor 151 according to the embodiment may determine the relative distance and width of the object on the basis of at least one of the image data and the radar data, and may determine the amount of collision overlap between the vehicle 1 and the object on the basis of the relative distance and the width of the object.

In this case, the amount of collision overlap may represent a size of an area of the vehicle 1 in which a collision with the object is predicted.

In addition, the processor 151 according to the embodiment may determine a collision mode on the basis of the amount of collision overlap, and may determine a collision severity on the basis of the impact amount, the relative speed of the object at the time of the collision, and the deceleration of the vehicle 1 at the time of the collision.

In this case, the vehicle 1 may further include a front impact sensor (FIS) to measure the amount of impact according to a collision with an object. The FIS may be implemented in a mechanical-type FIS using a spring, or in an electronic type FIS using a twisting system. However, the present invention is not limited thereto, and the FIS may be implemented using any type of sensor capable of measuring the amount of impact according to collision with an object.

The collision severity is a value that is compared with the deployment threshold, which is a criterion for deploying the safety device 180, and the processor 151 may control the safety device 180 to be deployed when the calculated collision severity is greater than or equal to the deployment threshold.

In detail, the processor 151 may control the safety device control unit (see 71 in FIG. 1) to deploy the safety device 180.

In this case, the collision severity may be proportional to the amount of impact, the relative speed of the object at the time of a collision, and the magnitude of deceleration of the vehicle 1 at the time of a collision.

In addition, the deployment threshold of the safety device 180 may vary depending on the collision mode. In detail, the collision mode may include a front collision mode, an angle collision mode, a pole collision mode, and a small overlap collision mode depending on the amount of collision overlap.

The processor 151 according to the embodiment may divide the front area of the vehicle 1 into n zones. The processor 151 may determine the collision mode to be a small overlap collision mode when a front left region or a front right region of the vehicle 1 corresponds to the amount of collision overlap, to be a pole collision mode when an intermediate region except for a front left region and a front right region corresponds to the amount of collision overlap, to be an angle collision mode when a part of an intermediate region and a front left region or front right region correspond to the amount of collision overlap, and to be a front collision mode when a front left region, a front right region, and an intermediate region correspond to the amount of collision overlap.

In this case, the deployment threshold of the safety device 180 may be set to be the lowest value in response to the front collision mode, and may be set to be the highest value in response to the small overlap collision mode.

That is, the deployment threshold of the safety device 180 may consecutively increase in the order of the front collision mode, the angle collision mode, the pole collision mode, and the small overlap collision mode.

The processor 151 according to the embodiment may determine whether to deploy the safety device 180 by comparing the collision severity with the deployment threshold of the safety device 180 that varies according to the collision mode.

That is, after the collision with the first object 2, the processor 151 may determine the relative distance and width of the second object 3 on the basis of at least one of the image data and the radar data, and determine the amount of collision overlap between the vehicle 1 and the second object 3 on the basis of the relative distance and the width of the second object 3. However, the method of determining the amount of collision overlap is not limited thereto, and the processor 151 may determine the amount of collision overlap on the basis of a collision area measured by a collision detection sensor at the time of a collision, or on the basis of the second predicted travel route 600 and the predicted position of the second object 3.

In addition, the processor 151 may determine the collision mode on the basis of the amount of collision overlap, and determine the collision severity on the basis of the impact amount, the relative speed of the second object 3 at the time of the collision, and the deceleration of the vehicle 1 at the time of the collision.

In this case, the deployment threshold of the safety device 180, which is compared with the collision severity and serves as a criterion for deploying the safety device 180, may vary depending on the collision mode.

In addition, the processor 151 may adjust the deployment threshold of the safety device 180 to be lowered in proportion to the probability of collision indicating the possibility of collision with the second object 3 before a collision with the second object 3 occurs.

In addition, the processor 151 may compare the lowered deployment threshold with the collision severity, and control the safety device control unit (71 in FIG. 1) to deploy that safety device 180, i.e., the airbag 181 and the seat belt pretensioner 182 when the collision severity exceeds the lowered deployment threshold.

Accordingly, the safety device 180 may be deployed earlier than the point of time for deploying the safety device 180 when the deployment threshold is not adjusted, so that the user of the vehicle 1 may be more efficiently protected from the secondary collision that may occur after the primary collision.

Hereinafter, a method of controlling the vehicle 1 according to an embodiment will be described. The vehicle 1 according to the above-described embodiment may apply to the method of controlling the vehicle 1 described below. Accordingly, the configurations described above with reference to FIGS. 1 to 10 apply to the method of controlling the vehicle 1 according to the embodiment without mentioned.

Figure 11:
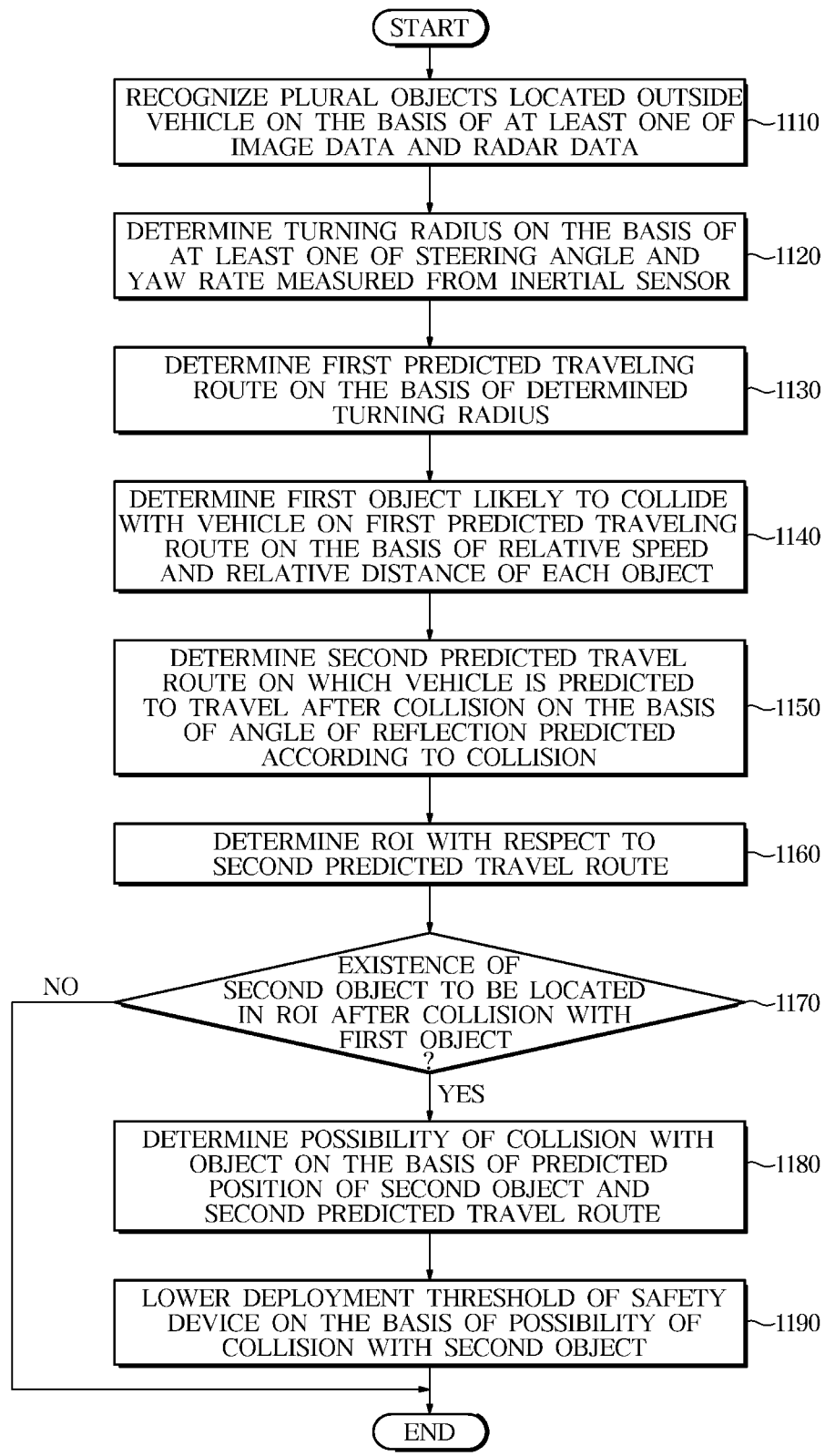
FIG. 11 is a flowchart showing a method of controlling a vehicle according to an embodiment, which shows an operation of adjusting a deployment threshold of a safety device on the basis of a collision prediction on a second predicted travel route.

FIG. 11 is a flowchart showing a method of controlling a vehicle 1 according to an embodiment, which shows an operation of adjusting a deployment threshold of a safety device 180 on the basis of a collision prediction on a second predicted travel route 600.

Referring to FIG. 11, the processor 151 according to the embodiment may recognize a plurality of objects 2 and 3 located outside the vehicle 1 on the basis of at least one of the image data and the radar data (1110).

In addition, the processor 151 according to the embodiment may determine a turning radius on the basis of at least one of the steering angle and the yaw rate measured from the inertial sensor 140 (1120).

In detail, the processor 151 may determine the turning radius on the basis of the wheelbase and the steering angle when the speed of the vehicle 1 is a low speed less than or equal to a predetermined first threshold speed or less, and determine the turning radius on the basis of the speed, the steering angle, and yaw rate of the vehicle 1 when the speed of the vehicle 1 is a medium speed greater than the predetermined first threshold speed but less than a predetermined second threshold speed, and determine the turning radius on the basis of the speed and the yaw rate of the vehicle 1 when the speed of the vehicle 1 is a high speed greater than or equal to the predetermined second threshold speed.

This is because as the speed of the vehicle 1 increases, the precision of a turning radius determined using the yaw rate becomes higher. The first threshold speed and the second threshold speed may be set in advance in the design stage of the vehicle 1, or may be adjusted later.

The processor 151 may determine the first predicted traveling route 400 on the basis of the determined turning radius (1130). That is, the processor 151 may determine a route corresponding to the determined turning radius to be the first predicted travel route 400.

In addition, the processor 151 according to the embodiment may determine a straight forward route to be the first predicted traveling route 400 when the determined turning radius is larger than a predetermined threshold radius. This is because the vehicle 1 may have a great steering angle while on the straight forward route depending on a traveling pattern of the user during traveling.

In this case, the processor 151 may recognize a plurality of lines located outside the vehicle 1 on the basis of at least one of the image data and the radar data, and determine a lane defined by lines that are closet to the vehicle 1 among the plurality of lines to be the first predicted traveling route 400.

The processor 151 according to the embodiment may determine a first object 2 that is likely to collide with the vehicle 1 on the first predicted traveling route 400 on the basis of the relative speed and relative distance of each of a plurality of objects (1140).

That is, the processor 151 may determine the relative speed and the relative distance of each of the plurality of objects 2 and 3 recognized on the basis of at least one of the image data and the radar data.

The processor 151 according to the embodiment may determine a first object 2 that is likely to collide with the vehicle 1 on the first predicted traveling route 400 on the basis of the relative speed and relative distance of each of the plurality of objects 2 and 3.

In this case, the first object 2 is an object that is predicted to collide with the vehicle 1 on the first predicted travel route 400 on the basis of the relative speed and relative distance with respect to the vehicle 1, among the plurality of objects 2 and 3.

In detail, the processor 151 may determine a predicted travel route for each of the plurality of objects 2 and 3 on the basis of the relative speed and the relative distance of each of the plurality of objects 2 and 3, compare the respective predicted travel routes with the first predicted travel route 400 to determine the possibility of collision of each object 2 or 3 with the vehicle 1 on the first predicted travel route 400, and determine a first object 2 that is likely to collide with the vehicle 1 on the first predicted travel route 400.

In this case, the processor 151 may calculate the time to collision on the basis of the relative speed and the relative distance of the first object 2, and determine the possibility of collision with the first object 2 by continuously determining the relative speed and the relative distance of the first object 2 during the determined time to collision.

The processor 151 according to the embodiment may determine the second predicted travel route 600 on which the vehicle 1 is predicted to travel after the collision with the first object 2 on the basis of a predicted angle of reflection in the collision with the first object 2 (1150).

That is, the processor 151 may determine an angle at which the vehicle 1 is predicted to be reflected after collision with the first object 2 in a situation in which a collision with the first object 2 is predicted to occur.

In detail, the processor 151 determines, in response to an existence of a possibility of collision with the first object 2, a collision position and a collision angle in a collision with the first object 2 on the basis of the relative speed and the relative distance of the first object 2.

In this case, the collision position corresponds to a position in which the collision occurs in the outer appearance of the vehicle 1, and the collision angle corresponds to an angle formed between a longitudinal direction of the first object 2 and a heading direction of the vehicle 1 at the time of collision.

The processor 151 may determine the angle of reflection on the basis of the type of the first object 2, the collision position in the collision with the first object 2, and the collision angle in the collision with the first object 2.

In this case, the processor 151 may determine the type of the object on the basis of the image data acquired from the front camera 110.

In this case, the memory 152 may store information regarding an angle of reflection according to a type of the object, a collision position, and a collision angle. That is, the memory 152 may store information regarding a predetermined angle of reflection according to an object type-specific elastic modulus, a collision position, and a collision angle.

For example, even at the same collision position and the same collision angle, an object corresponding to a normal passenger vehicle has an angle of reflection greater than that of an object corresponding to a truck or bus.

That is, the processor 151 may compare the type of the first object 2, the collision position in the collision with the first object 2, and the collision angle in the collision with the first object 2 with the information regarding the angle of reflection stored in the memory 152 to determine a predicted angle of reflection due to the collision with the first object 2.

In addition, the processor 151 may determine a direction in which the vehicle 1 is predicted to travel after the collision with the first object 2 on the basis of the predicted angle of reflection due to the collision with the first object 2, and may determine the second predicted traveling route 600 on the basis of the determined direction.

Accordingly, the processor 151 may determine the second predicted traveling route 600 on which the vehicle 1 is predicted to travel after the collision with the first object 2 on the basis of the predicted angle of reflection according to the collision with the first object 2.

The processor 151 according to the embodiment may determine the region of interest 700 with respect to the second predicted travel route 600 (1160).

In addition, the processor 151 may determine existence of a second object 3 that is predicted to be located in the ROI 700 after the collision with the first object 2 on the basis of the relative speed and relative distance of each of the plurality of objects 2 and 3 (1170).

In response to the existence of the second object 3 that is predicted to be located in the ROI 700 after the collision with the first object 2 (YES in operation 1170), the processor 151 according to the embodiment may determine the possibility of collision with the second object 3 on the basis of the second predicted travel route 600 and the predicted position of the second object 3 (1180).

In this case, the possibility of collision with the second object 3 may be represented by the probability of collision, and may be determined by a probability distribution function that forms a normal distribution according to the distance to the predicted position of the second object 3 with respect to the second predicted traveling route 600.

That is, the processor 151 may determine the possibility of collision represented by the probability of collision according to a probability distribution function that forms a normal distribution with the distance to the predicted position of the second object 3 with respect to the second predicted traveling route 600.

To this end, the processor 151 may determine the ROI 700 with respect to the second predicted travel route 600.

In detail, the processor 151 recognizes a plurality of lines located outside the vehicle 1 on the basis of at least one of the image data and the radar data, and determines the ROI 700 with respect to a lane on which the second predicted travel route 600 is located among a plurality of lanes defined by the plurality of lines.

In addition, the processor 151 may determine the ROI 700 to further include a lane adjacent to the lane in which the second predicted travel route 600 is located. This is because the vehicle 1 may travel on a route adjacent to the second predicted travel route 600 after the collision with the first object 2 rather than travelling on the second predicted traveling route 600 according to the braking and steering control of the user of the vehicle 1.

In addition, the processor 151 may determine the ROI to further include a region in a direction opposite to a direction in which the collision with the first object 2 is predicted to occur. This is to consider a case in which the vehicle 1 may be reflected at an angle different from an angle determined by the processor 151 after the collision with the first object 2. In detail, when the vehicle 1 collides with the first object 2, the user of the vehicle 1 may perform sudden braking or rapid steering. In this case, the vehicle 1 may collide with a rear lateral side object (not shown) located in a direction opposite to a direction of collision with the first object 2. Accordingly, the processor 151 may allow the ROI 700 to further include a region in a direction opposite to a direction in which the collision with the first object 2 is predicted to occur so that a rear lateral side object (not shown) may be determined to be a second object 3 as being predicted to collide after the collision with the first object 2.

As such, the processor 151 determines the ROI 700 for determining the second object 3 that is likely to collide with the vehicle 1 after the collision with the first object 2 with respect to the second predicted travel route 600.

That is, the processor 151 may determine a second object 3 that is predicted to be located in the ROI 700 after the collision with the first object 2 on the basis of at least one of the image data and the radar data.

In detail, the processor 151 according to the embodiment may determine a second object 3 that is predicted to be located in the ROI 700 after the collision with the first object 2 using the relative speed and the relative distance of a plurality of objects recognized on the basis of at least one of the image data and the radar data.

In addition, the processor 151 according to the embodiment may adaptively adjust the size of the ROI 700.

The processor 151 according to the embodiment may adjust the ROI 700 to be reduced in the longitudinal direction of the vehicle 1 in response to the braking system 160 being controlled to brake the vehicle 1 after the collision with the first object 2.

In addition, the processor 151 according to the embodiment may adjust the ROI 700 to be increased in the lateral direction of the vehicle 1 in response to the steering system 170 being controlled to steer the vehicle 1 after the collision with the first object 2.

As described above, the processor 151 may determine the ROI 700 with respect to the second predicted traveling route 600, and may determine existence of the second object 3 that is predicted to be located in the ROI 700 after the collision with the first object 2 using the relative position and relative speed of each of the plurality of objects recognized on the basis of at least one of the image data and the radar data.

The processor 151 according to the embodiment, in response to the existence of the second object 3 that is predicted to be located in the ROI 700 after the collision with the first object 2, may determine the possibility of collision with the second object 3 on the basis of the position of the second object 3 and the second predicted travel route 600 predicted after the collision with the first object 2.

In this case, the possibility of collision with the second object 3 may be represented by the probability of collision, and may be determined by a probability distribution function that forms a normal distribution according to the distance to the predicted position of the second object 3 with respect to the second predicted traveling route 600.

That is, as the predicted position of the second object 3 after the collision with the first object 2 becomes distant from the second predicted travel route 600, the possibility of collision is determined to have a low probability of collision. For example, when the predicted position of the second object 3 is on the second predicted traveling route 600, the possibility of collision may have a probability of collision of 100%, and as the predicted position of the second object 3 becomes distant from the second predicted traveling route 600, the probability of collision indicating the possibility of collision may decrease.

The processor 151 according to the embodiment may lower a deployment threshold of the safety device 180 on the basis of the possibility of collision with the second object 3 (1190).

That is, the processor 151 may lower the deployment threshold, which is to be compared with a collision severity for deploying the safety device 180, in response to the existence of the second object 3 that is likely to collide with the vehicle 1 on the second predicted travel route 600.

In this case, the degree to which the deployment threshold of the safety device 180 is lowered may be proportional to the probability of collision indicating the possibility of collision between the vehicle 1 and the second object 3. That is, in the case of a high probability of collision, the processor 151 may lower the deployment threshold of the safety device 180 to a large degree such that the safety device 180 is more rapidly deployed.

In this way, the vehicle 1 may more rapidly deploy the safety device 180 in a secondary collision predicted after a collision with a first object, that is, a collision with a second object.

As such, in response to the existence of the second object 3 that is likely to collide with the vehicle 1 on the second predicted traveling route 600, the processor 151 adjusts the deployment threshold of the airbag 181 and the seat belt pretensioner 182 corresponding to the safety device 180 to be lowered, so that the safety device 180 is deployed at a lower collision severity, that is, at an earlier point of time, thus allowing the safety of the user of the vehicle 1 to be more efficiently achieved.

That is, when the vehicle 1 is predicted to have a secondary collision after a collision of an impact severity at which the safety device 180 is not deployed, the vehicle 1 adjusts the deployment threshold such that the safety device 180 is more rapidly deployed to protect the user of the vehicle 1 from the secondary collision, thus more effectively protecting the user of the safety device 180 from the secondary collision.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

As is apparent from the above, the vehicle and the control method for the same, in preparation for a secondary collision that occurs after a collision with an object, can determine the possibility of the secondary collision before the secondary collision and adjust a deployment threshold of a safety device according to the possibility of the secondary collision for rapid deployment of the safety device, so that the injury of a user due to the secondary collision is minimized.

Although exemplary embodiments of the present disclosure have been described for illustrative purposes, those skilled in the art will appreciate that various modifications, additions and substitutions are possible,

What is claimed is:

1. A vehicle comprising:
an inertial sensor configured to measure a speed, a steering angle, and a yaw rate of the vehicle;
a camera configured to acquire image data regarding a front of the vehicle;
a radar configured to acquire radar data regarding an outside of the vehicle;
a safety device including an air bag and a seat belt pretensioner; and
a controller configured to predict a collision with a first object located at the outside of the vehicle based on the image data or the radar data, to predict a collision with a second object that is likely to occur after the collision with the first object based on an angle of reflection predicted at a time of the collision with the first object, determine a probability of collision with the second object on the basis of a second predicted travel route and a predicted position of the second object, and, in response to predicting that the collision with the second object is likely to occur and the determined probability of collision with the second object, to lower a deployment threshold that is compared with a collision severity.

2. The vehicle of claim 1, wherein the controller is configured to determine a collision position and a collision angle in the collision with the first object based on a relative speed and a relative position of the first object, and to determine the angle of reflection based on a type of the first object, the collision position, and the collision angle.

3. The vehicle of claim 1, wherein the controller is configured to recognize a plurality of objects located at the outside of the vehicle based on the image data or the radar data, to determine a turning radius based on the steering angle or the yaw rate to determine a first predicted travel route of the vehicle, to determine the first object that has a possibility of collision with the vehicle on the first predicted travel route based on a relative speed and a relative distance of each of the plurality of objects, to determine the second predicted travel route of the vehicle on which the vehicle is predicted to travel after the collision based on the angle of reflection, and, in response to existence of the second object that has a possibility of collision with the vehicle on the second predicted travel route, to lower the deployment threshold.

4. The vehicle of claim 3, wherein the controller is configured to determine a region of interest with respect to the second predicted travel route, and to determine the second object that is predicted to be located in the region of interest after the collision with the first object based on the relative speed and the relative distance of each of the plurality of objects.

5. The vehicle of claim 4, wherein the controller is configured to lower the deployment threshold in proportion to the probability of collision represented by the possibility of collision with the second object.

6. The vehicle of claim 5, wherein the probability of collision has a normal distribution according to a distance to the predicted position of the second object in the second predicted travel route.

7. The vehicle of claim 4, wherein the controller is configured to recognize a plurality of lines located at the outside of the vehicle based on the at least one of the image data and the radar data, and to determine the region of interest with respect to a lane on which the second predicted travel route is located, among a plurality of lanes segmented by the plurality of lines.

8. The vehicle of claim 7, wherein the controller is configured to determine the region of interest to further include a lane adjacent to the lane on which the second predicted travel route is located.

9. The vehicle of claim 7, wherein the controller is configured to determine the region of interest to further include a region in a direction opposite to a direction in which the collision with the first object is predicted to occur.

10. The vehicle of claim 4, further comprising a braking system for controlling braking of the vehicle, wherein the controller is configured to adjust the region of interest to be reduced in a longitudinal direction of the vehicle at a time of controlling the braking system after the collision with the first object.

11. The vehicle of claim 4, further comprising a steering system for controlling steering of the vehicle, wherein the controller is configured to adjust the region of interest to be increased in a lateral direction of the vehicle at a time of controlling the steering system after the collision with the first object.

12. The vehicle of claim 3, wherein the controller is configured to determine the turning radius based on a vehicle wheel angle determined by a wheelbase and the steering angle when the vehicle has a speed lower than or equal to a predetermined first threshold speed.

13. The vehicle of claim 12, wherein the controller is configured to determine the turning radius based on the speed and the yaw rate when the vehicle has a speed greater than or equal to a predetermined second threshold speed.

14. The vehicle of claim 13, wherein the controller is configured to determine the turning radius based on the speed, the steering angle, and the yaw rate when the vehicle has a speed greater than the predetermined first threshold but less than the predetermined second threshold speed.

15. The vehicle of claim 3, wherein the controller is configured to determine the first predicted travel route to be a straight route when the turning radius is larger than a predetermined threshold radius.

16. The vehicle of claim 15, wherein the controller is configured to recognize a plurality of lines located at the outside of the vehicle based on the image data or the radar data, and to determine the first predicted travel route to be a lane that is segmented by lines that are closest to the vehicle, among the plurality of lines.

17. A method of controlling a vehicle that includes an inertial sensor configured to measure a speed, a steering angle, and a yaw rate of the vehicle, a camera configured to acquire an image data regarding a front of the vehicle, a radar configured to acquire a radar data regarding an outside of the vehicle, and a safety device that includes an air bag and a seat belt pretensioner, the method comprising:
predicting a collision with a first object located at the outside of the vehicle based on the image data or the radar data;
predicting a collision with a second object that is likely to occur after the collision with the first object based on an angle of reflection predicted at a time of the collision with the first object;
determining a probability of collision with the second object based on a second predicted travel route and a predicted position of the second object; and
in response to predicting that the collision with the second object is likely to occur and based on the determined probability of collision with the second object, lowering a deployment threshold that is compared with a collision severity such that the safety device is deployed before the collision with the second object.

18. The method of claim 17, wherein lowering the deployment threshold comprises:
recognizing a plurality of objects located at the outside of the vehicle based on the image data or the radar data;
determining a turning radius based on the steering angle or the yaw rate to determine a first predicted travel route of the vehicle;
determining the first object that has a possibility of collision with the vehicle on the first predicted travel route based on a relative speed and a relative distance of each of the plurality of objects;
determining the second predicted travel route of the vehicle on which the vehicle is predicted to travel after the collision based on the angle of reflection; and
in response to existence of the second object that has a possibility of collision with the vehicle on the second predicted travel route, lowering the deployment threshold.

19. The method of claim 18, further comprising:
determining a region of interest with respect to the second predicted travel route; and
determining the second object that is predicted to be located in the region of interest after the collision with the first object based on the relative speed and the relative distance of each of the plurality of objects.

20. The method of claim 19, wherein lowering the deployment threshold comprises lowering the deployment threshold in proportion to the probability of collision represented by the possibility of collision with the second object.

21. The method of claim 20, wherein the probability of collision has a normal distribution according to a distance to the predicted position of the second object in the second predicted travel route.

22. The method of claim 19, wherein determining the region of interest comprises:
recognizing a plurality of lines located at the outside of the vehicle based on the image data or the radar data; and
determining the region of interest with respect to a lane on which the second predicted travel route is located, among a plurality of lanes segmented by the plurality of lines.

23. The method of claim 22, wherein determining the region of interest comprises determining the region of interest to further include a lane adjacent to the lane on which the second predicted travel route is located.

24. The method of claim 22, wherein determining the region of interest comprises determining the region of interest to further include a region in a direction opposite to a direction in which the collision with the first object is predicted to occur.

25. The method of claim 19, wherein the vehicle further comprises a braking system for controlling braking of the vehicle, the method further comprising adjusting the region of interest to be reduced in a longitudinal direction of the vehicle when controlling the braking system after the collision with the first object.

26. The method of claim 19, wherein the vehicle further comprises a steering system for controlling steering of the vehicle, the method further comprising adjusting the region of interest to be increased in a lateral direction of the vehicle when controlling the steering system after the collision with the first object.

27. The method of claim 18, further comprising:
determining a collision position and a collision angle in the collision with the first object based on a relative speed and a relative position of the first object; and
determining the angle of reflection based on a type of the first object, the collision position, and the collision angle.

28. A method of controlling a vehicle that includes an inertial sensor configured to measure a speed, a steering angle, and a yaw rate of the vehicle, a camera configured to acquire an image data regarding a front of the vehicle, a radar configured to acquire a radar data regarding an outside of the vehicle, and a safety device that includes an air bag and a seat belt pretensioner, the method comprising:
predicting a collision with a first object located at the outside of the vehicle based on the image data or the radar data;
predicting a collision with a second object that is likely to occur after the collision with the first object based on an angle of reflection predicted at a time of the collision with the first object; and
in response to predicting that the collision with the second object is likely to occur, lowering a deployment threshold that is compared with a collision severity such that the safety device is deployed before the collision with the second object, wherein lowering the deployment threshold comprises:
recognizing a plurality of objects located at the outside of the vehicle based on the image data or the radar data;
determining a turning radius based on the steering angle or the yaw rate to determine a first predicted travel route of the vehicle, wherein determining that the turning radius comprises determining the turning radius based on a vehicle wheel angle determined by a wheelbase and the steering angle when the vehicle has a speed lower than or equal to a predetermined first threshold speed;
determining the first object that has a possibility of collision with the vehicle on the first predicted travel route based on a relative speed and a relative distance of each of the plurality of objects;

determining a second predicted travel route of the vehicle on which the vehicle is predicted to travel after the collision based on the angle of reflection; and in response to existence of the second object that has a possibility of collision with the vehicle on the second predicted travel route, lowering the deployment threshold.

29. The method of claim 28, wherein determining the turning radius comprises determining the turning radius based on the speed and the yaw rate when the vehicle has a speed greater than or equal to a predetermined second threshold speed.

30. The method of claim 29, wherein determining the turning radius comprises determining the turning radius based on the speed, the steering angle, and the yaw rate when the vehicle has a speed greater than the predetermined first threshold but less than the predetermined second threshold speed.

31. The method of claim 18, wherein determining the first predicted travel route comprises determining the first predicted travel route to be a straight route when the turning radius is larger than a predetermined threshold radius.

32. The method of claim 31, wherein determining the first predicted travel route comprises:

recognizing a plurality of lines located at the outside of the vehicle based on the at least one of the image data and the radar data; and determining the first predicted travel route to be a lane that is segmented by lines that are closest to the vehicle, among the plurality of lines.

\* \* \* \* \*